US011873771B2

(12) United States Patent
Cervelli et al.

(10) Patent No.: US 11,873,771 B2
(45) Date of Patent: Jan. 16, 2024

(54) PROPELLER ASSEMBLY AND PITCH CONTROL UNIT

(71) Applicants: GE Aviation Czech s.r.o., Prague (CZ); GE Avio S.r.l., Rivalta di Torino (IT)

(72) Inventors: Giuseppe Cervelli, Bari (IT); Simone Castellani, Bari (IT); Miriam Manzoni, Rivalta di Torino (IT); Giuseppe Bellocchio, Rivalta di Torino (IT); Vojtech Jirasek, Prague (CZ)

(73) Assignees: GE AVIO S.R.L., Rivalta di Torino (IT); GE AVIATION CZECH S.R.O., Prague (CZ)

( * ) Notice: Subject to any disclaimer, the term of this patent is extended or adjusted under 35 U.S.C. 154(b) by 0 days.

(21) Appl. No.: 18/061,852

(22) Filed: Dec. 5, 2022

(65) Prior Publication Data
US 2023/0106850 A1 Apr. 6, 2023

Related U.S. Application Data

(63) Continuation of application No. 16/920,159, filed on Jul. 2, 2020, now Pat. No. 11,519,346.

(30) Foreign Application Priority Data

Jul. 4, 2019 (IT) .......................... 102019000010929

(51) Int. Cl.
F02D 29/02 (2006.01)
B64C 11/38 (2006.01)
(Continued)

(52) U.S. Cl.
CPC ............ F02D 29/02 (2013.01); B64C 11/385 (2013.01); B64C 11/40 (2013.01); B63H 3/10 (2013.01); F02B 61/045 (2013.01)

(58) Field of Classification Search
CPC . B64D 2027/005; Y02T 50/66; Y02T 50/673; B64C 11/30; B64C 11/308;
(Continued)

(56) References Cited

U.S. PATENT DOCUMENTS 2,588,371 A   3/1952 Englesson
2,761,518 A   9/1956 Treseder et al.
(Continued)

FOREIGN PATENT DOCUMENTS

EP   3434585   1/2019

OTHER PUBLICATIONS

Italian Patent Office, "Search Report," issued in connection with Italian patent application No. 102019000010929, dated Mar. 13, 2020, 8 pages.
(Continued)

Primary Examiner — Carl C Staubach
(74) Attorney, Agent, or Firm — HANLEY, FLIGHT & ZIMMERMAN, LLC

(57) ABSTRACT

A variable pitch propeller assembly operatively coupled with an engine and methods for controlling the pitch of a plurality of propeller blades thereof is provided. In one example aspect, the variable pitch propeller assembly includes features for combining overspeed, feathering, and reverse functionality in a single secondary control valve. The secondary control valve is operable to selectively allow a controlled amount of hydraulic fluid to flow to or from a pitch actuation assembly such that the pitch of the propeller blades can be adjusted to operate the variable pitch propeller assembly in one of a constant speed mode, a feather mode, and a reverse mode.

12 Claims, 12 Drawing Sheets

(51) Int. Cl.
  *B64C 11/40*   (2006.01)
  *B63H 3/10*    (2006.01)
  *F02B 61/04*   (2006.01)

(58) Field of Classification Search
  CPC ......... B64C 11/385; B64C 11/42; F01D 7/00;
               F02C 3/067; F02K 3/072; F05D
               2220/324; F05D 2220/325; F05D 2260/70
  See application file for complete search history.

(56) References Cited

U.S. PATENT DOCUMENTS

| | | |
|---|---|---|
| 2,869,650 A | 1/1959 | Fairhurst et al. |
| 3,434,585 A | 3/1969 | Lee |
| 3,893,789 A | 7/1975 | Andrews |
| 4,348,155 A | 9/1982 | Barnes et al. |
| 4,671,736 A | 6/1987 | Finnigan |
| 4,738,589 A | 4/1988 | Wright |
| 5,263,898 A | 11/1993 | Elston, III et al. |
| 5,364,231 A | 11/1994 | Eick et al. |
| 5,836,743 A | 11/1998 | Carvalho et al. |
| 6,059,528 A | 5/2000 | Danielson et al. |
| 6,196,797 B1 | 3/2001 | Bogden et al. |
| 7,118,336 B2 | 10/2006 | Waddleton |
| 8,075,271 B2 | 12/2011 | Muhlbauer |
| 11,143,200 B2 | 10/2021 | Albrecht et al. |
| 11,519,346 B2 | 12/2022 | Cervelli et al. |
| 2011/0274544 A1 | 11/2011 | Swift et al. |
| 2013/0323050 A1 | 12/2013 | Kleckler |
| 2014/0070534 A1 | 3/2014 | Hamano et al. |
| 2014/0294585 A1 | 10/2014 | Escure et al. |
| 2018/0043989 A1 | 2/2018 | Tajan et al. |
| 2018/0057146 A1 | 3/2018 | Futa, Jr. et al. |
| 2018/0072402 A1 | 3/2018 | Waddleton |
| 2018/0334242 A1 | 11/2018 | Pedrami et al. |
| 2019/0031319 A1 | 1/2019 | Calkins et al. |
| 2019/0136867 A1 | 5/2019 | Albrecht et al. |
| 2020/0198765 A1 | 6/2020 | Futa, Jr. et al. |
| 2020/0298959 A1 | 9/2020 | Castellani et al. |
| 2021/0079855 A1* | 3/2021 | Cervelli ................. B64C 11/44 |

OTHER PUBLICATIONS

United States Patent and Trademark Office, "Non-Final Office action," issued in connection with U.S. Appl. No. 16/920,159, dated Feb. 15, 2019, 14 pages.

United States Patent and Trademark Office, "Notice of allowance," issued in connection with U.S. Appl. No. 16/920,159, dated Jun. 2, 2022, 8 pages.

* cited by examiner

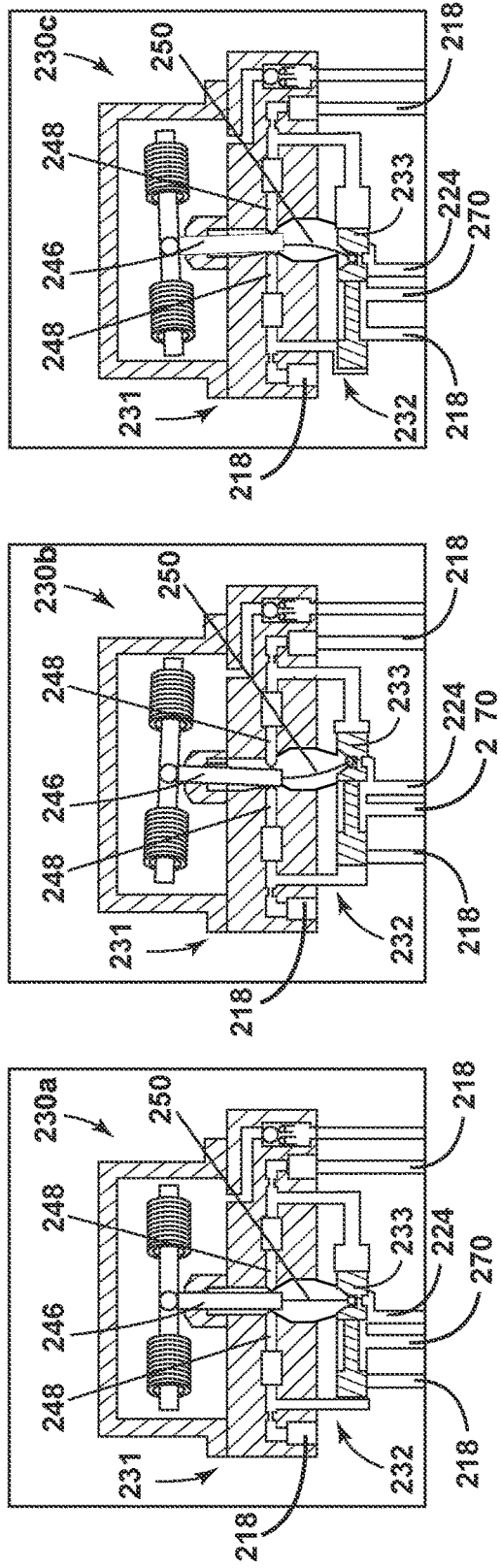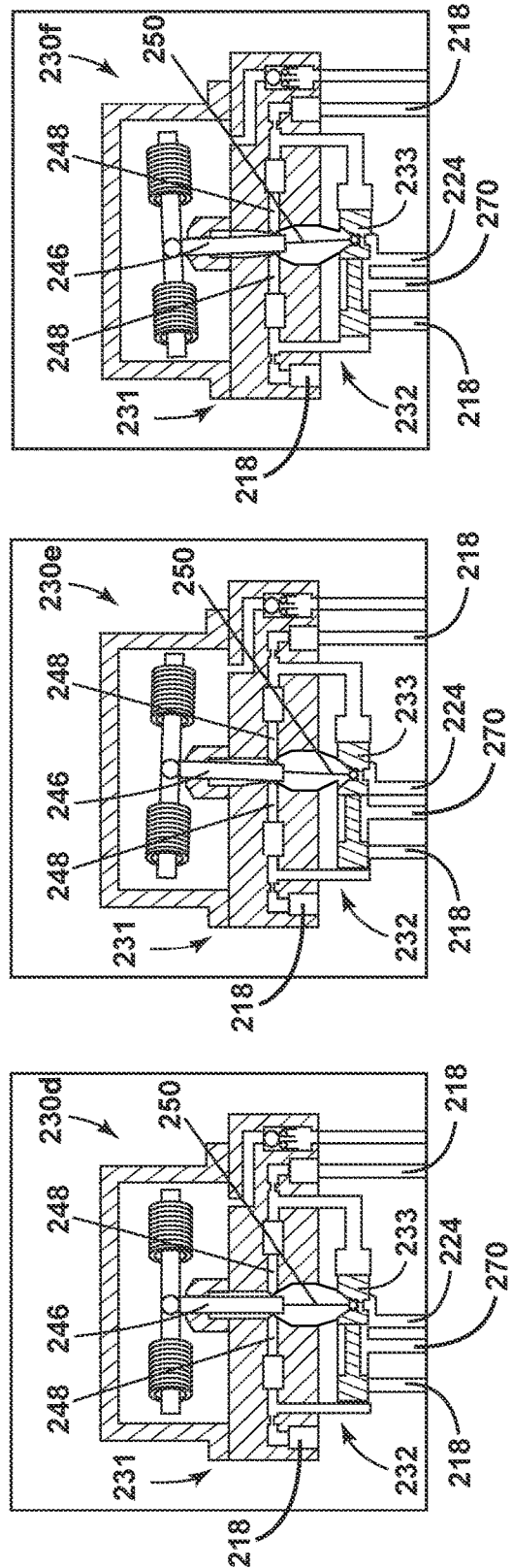
FIG. 8

PROPELLER ASSEMBLY AND PITCH CONTROL UNIT

RELATED APPLICATIONS

This patent claims the benefit of priority to U.S. patent application Ser. No. 16/920,159, filed on Jul. 2, 2020, entitled "PROPELLER ASSEMBLY AND PITCH CONTROL UNIT," which claims priority to Italian Patent Application No. 102019000010929, filed on Jul. 4, 2019, entitled "PROPELLER ASSEMBLY AND PITCH CONTROL UNIT," both of which are incorporated herein by reference in their entireties.

TECHNICAL FIELD

The present disclosure relates generally to propeller control units.

BACKGROUND

Variable pitch propeller assemblies for aircraft are operatively configured to adjust propeller blades of the propeller assembly through a plurality of blade angles. In this manner, the propeller blades can be adjusted to a propeller blade angle that optimizes engine performance for given flight conditions or for ground operations. To adjust the propeller blade angle of the propeller blades, variable pitch propeller assemblies typically include a pitch control unit. Certain pitch control units can include a primary pitch control valve or governor. Based on one or more input signals, the primary control valve selectively allows an amount of hydraulic fluid to flow to or drain from a pitch actuation assembly positioned within the propeller assembly. By altering the amount of hydraulic fluid in the pitch actuation assembly, the blade angle of the propeller blades can be set to the desired pitch.

For constant-speed variable pitch propeller assemblies, the pitch control unit is configured to maintain constant engine speed by adjusting the propeller blade angle to vary the load on the propeller in response to changing flight conditions. In particular, the primary control valve modulates the pitch of the propeller blades to keep the reference speed. In some instances, the propeller assembly can experience an overspeed condition, which occurs when propeller RPM increases above the reference speed, and in some instances, the propeller assembly can experience an underspeed condition, which occurs when propeller RPM decreases below the reference speed. When an overspeed or underspeed condition is experienced, the primary control valve controls the flow of hydraulic fluid through the system such that the propeller assembly returns to an onspeed condition, or a condition in which the actual RPM of the engine is the same as the reference speed.

Moreover, some variable pitch propeller assemblies are configured as feathering propeller assemblies. Such feathering propeller assemblies typically include a solenoid-operated feather valve. The solenoid-operated feather valve is operatively configured to switch the propeller assembly into a feather mode. The feathering mode can be commanded by a pilot by a dedicated cockpit switch, can be commanded by an engine controller after a normal shutdown, or can be commanded automatically by the engine controller (i.e., autofeather) when an engine flames out or an unexpected sudden reduction of power is detected. Such conventional solenoid-operated feather valves and accompanying sensing components can increase the weight of the engine, which is a penalty on the efficiency of the engine.

In addition, some variable pitch propeller assemblies include ground beta or reverse mode functionality. For instance, some propeller assemblies include a ground beta enable solenoid and a ground beta enable valve that effectively enable the propeller blades to move to a fine pitch position, e.g., for taxiing on the ground, or a reverse angle, e.g., for reverse and braking. These conventional solenoids and valves can increase the weight of the engine, which is a penalty on the efficiency of the engine.

BRIEF DESCRIPTION

The present disclosure relates to a variable pitch propeller assembly for an engine defining an axial direction, a radial direction, and a circumferential direction, the variable pitch propeller assembly including a plurality of propeller blades rotatable about the axial direction and spaced apart along the circumferential direction, each propeller blade rotatable through a plurality of blade angles about respective pitch axes each extending in the radial direction, a pitch actuation assembly for adjusting the plurality of propeller blades through the plurality of blade angles and including a propeller dome defining a chamber, and a pitch control unit, including at least one electrohydraulic servovalve operable to selectively allow a flow of hydraulic fluid to or from the propeller dome of the pitch actuation assembly and when hydraulic fluid is not located at an inlet port of the at least one electrohydraulic servovalve an oil starvation condition is defined, and at least one valve selectively fluidly coupling the propeller dome to the inlet port of the at least one electrohydraulic servovalve. Any permutation of aspects of the disclosure can also include wherein the at least one valve is a one-way valve having an inlet fluidly coupled to the propeller dome and an outlet fluidly coupled to the inlet port of the at least one electrohydraulic servovalve and during the oil starvation condition the one-way valve is configured to fluidly couple the propeller dome to the inlet port of the at least one electrohydraulic servovalve. Any permutation of aspects of the disclosure can also include wherein the at least one electrohydraulic servovalve is a primary pitch control valve having a first stage and a second stage and the one-way valve is selectively fluidly coupled with the first stage. Any permutation of aspects of the disclosure can also include wherein the plurality of propeller blades move to a feather mode during the oil starvation condition at a lower speed as compared the pitch control unit without the at least one valve.

Any permutation of aspects of the disclosure can also include wherein the at least one valve is a pitch lock valve having an inlet fluidly coupled to the propeller dome and a set of outlets and during the oil starvation condition the pitch lock valve is configured to fluidly uncouple the propeller dome to the inlet port of the at least one electrohydraulic servovalve. Any permutation of aspects of the disclosure can also include wherein the at least one electrohydraulic servovalve includes a primary control valve operable to selectively allow a flow of hydraulic fluid to or from the pitch actuation assembly and a secondary control valve adjustable between a constant speed mode, a feather mode, and a reverse mode and operable to selectively allow a flow of hydraulic fluid to or from the pitch actuation assembly based at least in part on the mode of the secondary control valve. Any permutation of aspects of the disclosure can also include wherein the set of outlets includes a first outlet fluidly coupled to a first stage of the primary control valve, a second outlet fluidly coupled to a first stage of the secondary control valve, and a third outlet fluidly coupled a drain line. Any permutation of aspects of the disclosure can also include wherein the pitch lock valve includes a valve body moveable between a first position wherein the first outlet and the second outlet are fluidly coupled with the inlet and a second position wherein the third outlet is fluidly coupled to the inlet. Any permutation of aspects of the disclosure can also include wherein the valve body is configured to be moveable from the first position to the second position based on a decrease in internal pressure caused during the oil starvation condition. Any permutation of aspects of the disclosure can also include a solenoid valve fluidly coupled between the third outlet and the drain line and operable to selectively open and close a flow of hydraulic fluid through the drain line. Any permutation of aspects of the disclosure can also include wherein the solenoid valve is one of user actuated or automatically controller actuated. Any permutation of aspects of the disclosure can also include wherein actuation of the solenoid valve opens the flow of hydraulic fluid through the drain line. Any permutation of aspects of the disclosure can also include wherein the secondary control valve includes a valve body defining a chamber and a spool movable within the chamber and where the spool defines a first groove and a second groove, and wherein the primary control valve is fluidly connected with the first groove when the spool is in at least one constant speed position or in at least one reverse position.

Any permutation of aspects of the disclosure can also include wherein the pitch actuation assembly includes a control piston translatable within the propeller dome, a piston rod connected to the control piston and extending into a propeller gear box of the engine, the piston rod translatable in unison with the control piston, an oil transfer bearing surrounding the piston rod within the propeller gear box of the engine and defining a flight gallery fluidly connected with the secondary control valve and a ground gallery fluidly connected with the secondary control valve, and a beta tube enclosed within the piston rod and fluidly connecting the flight gallery with the chamber of the propeller dome. Any permutation of aspects of the disclosure can also include wherein a flight gallery conduit fluidly connects the secondary control valve with the flight gallery and a ground gallery conduit fluidly connects the secondary control valve with the ground gallery.

The present disclosure also relates to a method for controlling a variable pitch propeller assembly driven by a powerplant, the powerplant defining an axial direction and a radial direction and including a controller, the variable pitch propeller assembly having a plurality of propeller blades rotatable about the axial direction and adjustable about respective pitch axes each extending along the radial direction, the propeller control system including a pitch actuation assembly for actuating the propeller blades about their respective pitch axes and a pitch control unit for driving the pitch actuation assembly and including a primary control valve and a secondary control valve both communicatively coupled with the controller, the primary control valve and the secondary control valve each configured to selectively control a flow of hydraulic fluid to or from the pitch actuation assembly, the method including operating the powerplant, controlling, by the controller, the secondary control valve adjustable between a constant speed mode, a feather mode, and a reverse mode to selectively allow a controlled amount of hydraulic fluid to or from the pitch actuation assembly, selectively diverting, during an oil starvation condition, hydraulic fluid from a propeller dome of the variable pitch propeller assembly via at least one valve. Any permutation of aspects of the disclosure can also include wherein the at least one valve is a one-way valve having an inlet fluidly coupled to the propeller dome and an outlet fluidly coupled to an inlet port of the primary control valve and during the oil starvation condition the one-way valve provides fluidly coupling from the propeller dome to the inlet port of the primary control valve. Any permutation of aspects of the disclosure can also include controlling a feathering with the primary control valve upon a failure of the secondary control valve. Any permutation of aspects of the disclosure can also include wherein the at least one valve is a pitch lock valve having an inlet fluidly coupled to the propeller dome, a first outlet fluidly coupled to a first stage of the primary control valve, a second outlet fluidly coupled to a first stage of the secondary control valve, and a third outlet fluidly coupled a drain line and where selectively diverting the hydraulic fluid includes moving a valve body moveable between a first position wherein the first outlet and the second outlet are fluidly coupled with the inlet or a second position wherein the third outlet is fluidly coupled to the inlet. Any permutation of aspects of the disclosure can also include wherein selectively diverting the hydraulic fluid from the propeller dome further includes opening a valve on the drain line to create a feather condition.

BRIEF DESCRIPTION OF THE DRAWINGS

FIG. 8 illustrates pitch control valve behavior in a normal mode and oil starvation mode.

DETAILED DESCRIPTION

Figure 1:
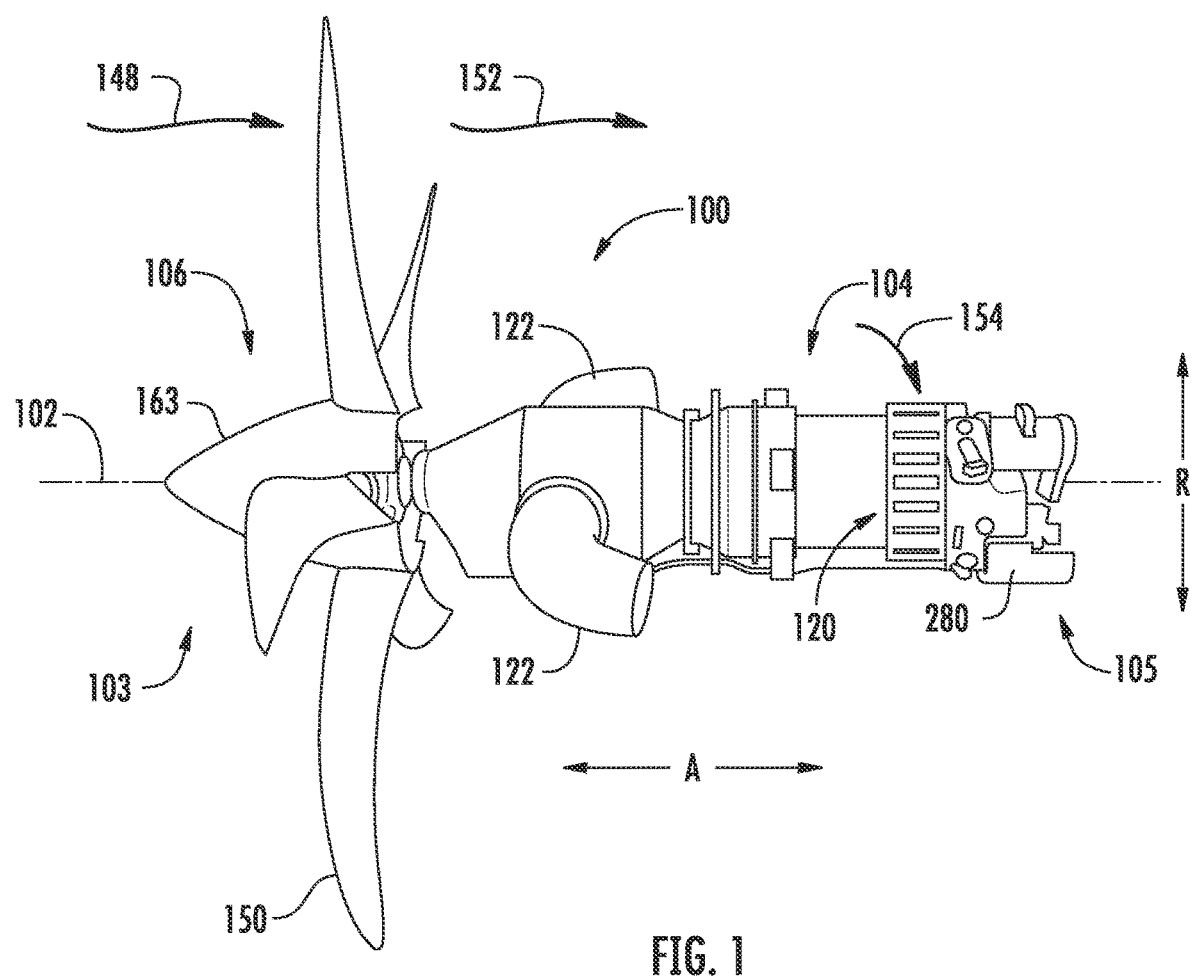
FIG. 1 is a side view of an example gas turbine engine according to an example of the present disclosure as described herein.

The present disclosure relates generally to variable pitch propeller assemblies and methods therefore for controlling the pitch of a plurality of propeller blades of a variable pitch propeller assembly including during an oil starvation condition. In one example aspect, the variable pitch propeller assembly includes features for combining overspeed, feathering, and reverse enabling functionality in a single electrohydraulic servovalve (EHSV). In particular, in one example aspect, a variable pitch propeller assembly includes a secondary EHSV control valve operatively configured to protect the propeller assembly and engine from an overspeed condition, and more generally for maintaining the propeller assembly and engine in an onspeed condition during flight, as well as providing feathering functionality in the event a primary pitch control valve fails or is otherwise unresponsive or operating conditions require it. Further, the secondary control valve is operatively configured to enable reverse functionality. That is, the secondary control valve is configured to enable the propeller blades to be actuated to a reverse pitch, e.g., to produce a reverse thrust. The secondary control valve is operable to selectively allow a controlled amount of hydraulic fluid to flow to or from a pitch actuation assembly such that the pitch of the propeller blades can be adjusted to operate the variable pitch propeller assembly in one of a constant speed mode, a feather mode, and a reverse mode.

The present disclosure allows for methods and pitch control units that selectively divert, during an oil starvation condition, hydraulic fluid from a propeller dome of the variable pitch propeller assembly via at least one valve. This allows for the forestalling or preclusion altogether of a feather mode. It is contemplated that an emergency feathering can be commanded if necessary.

As used herein, the terms "first," "second," and "third" may be used interchangeably to distinguish one component from another and are not intended to signify location or importance of the individual components. As used herein, "a set" can include any number of the respectively described elements, including only one element. The terms "upstream" and "downstream" refer to the relative direction with respect to fluid flow in a fluid pathway. For example, "upstream" refers to the direction from which the fluid flows, and "downstream" refers to the direction to which the fluid flows. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

Figure 2:
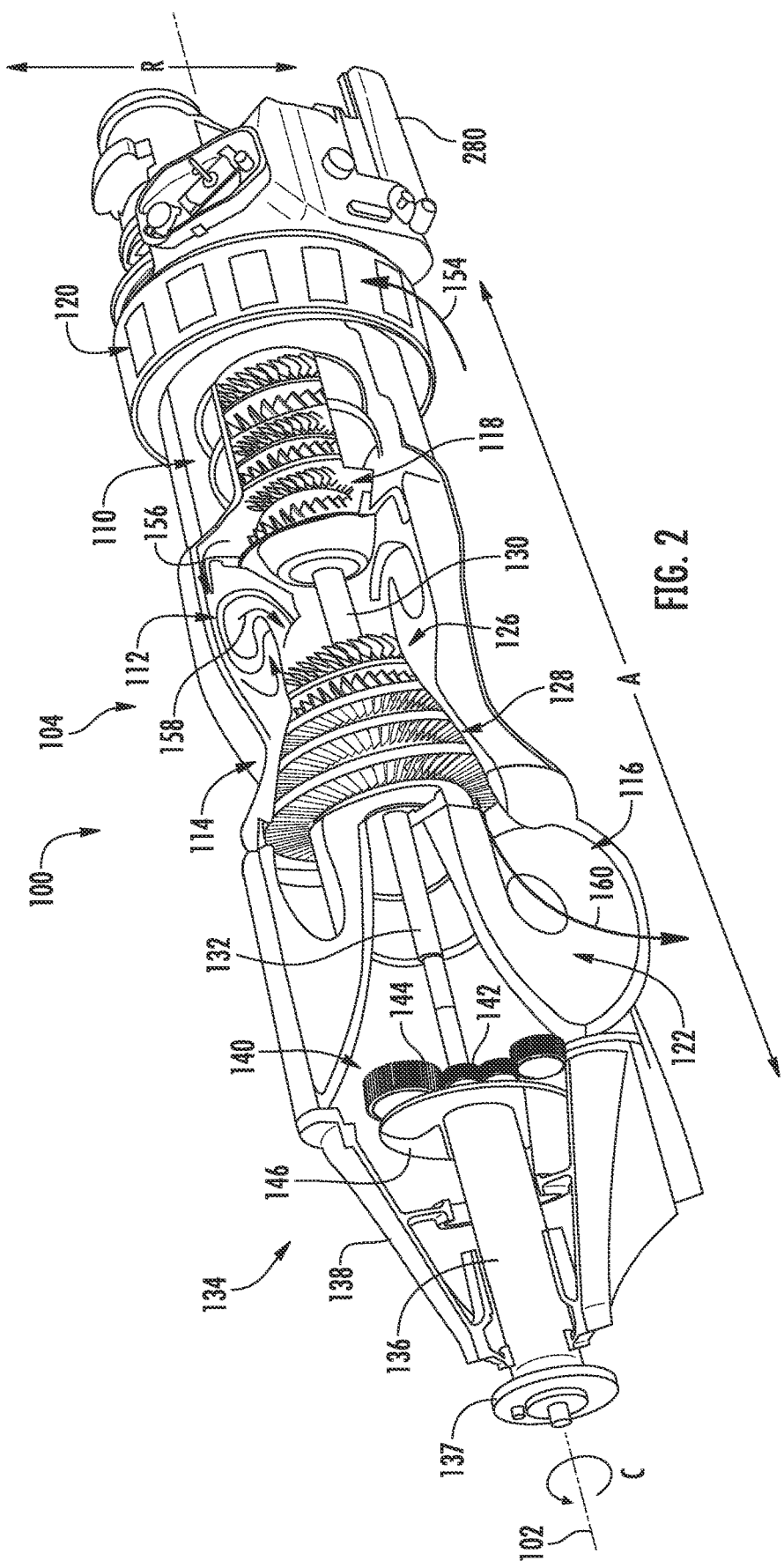
FIG. 2 is a perspective, cutaway view of the gas turbine engine of FIG. 1.

FIGS. 1 and 2 provide various views of an example engine 100 according to examples of the present disclosure. Particularly, FIG. 1 provides a side view of the engine 100 and FIG. 2 provides a perspective, cutaway view of the engine 100 of FIG. 1. As shown in FIG. 1, the engine 100 is a gas turbine engine, and more specifically, a turboprop engine. The gas turbine engine 100 defines an axial direction A, a radial direction R, and a circumferential direction C (FIG. 2) extending three hundred sixty degrees (360°) around the axial direction A. The gas turbine engine 100 also defines a longitudinal or axial centerline 102 extending along the axial direction A. The gas turbine engine 100 extends generally along the axial direction A between a first end 103 and a second end 105, which is the forward and aft end, respectively. Generally, the gas turbine engine 100 includes a gas generator or core turbine engine 104 and a propeller assembly 106 rotatable about the axial centerline 102, or more generally, the axial direction A.

As shown best in FIG. 2, the core turbine engine 104 generally includes, in serial flow arrangement, a compressor section 110, a combustion section 112, a turbine section 114, and an exhaust section 116. A core air flow path 118 extends from an annular inlet 120 to one or more exhaust outlets 122 of the exhaust section 116 such that the compressor section 110, combustion section 112, turbine section 114, and exhaust section 116 are in fluid communication.

The compressor section 110 can include one or more compressors, such as a high pressure compressor (HPC) and a low pressure compressor (LPC). For this example, the compressor section 110 includes a four-stage axial, single centrifugal compressor. In particular, the compressor includes sequential stages of compressor stator vanes and rotor blades (not labeled), as well as an impeller (not labeled) positioned downstream of the axial stages of stator vanes and rotor blades. The combustion section 112 includes a reverse-flow combustor (not labeled) and one or more fuel nozzles (not shown). The turbine section 114 can define one or more turbines, such as a high pressure turbine (HPT) and a low pressure turbine (LPT). For this example, the turbine section 114 includes a two-stage HPT 126 for driving the compressor of the compressor section 110. The HPT 126 includes two sequential stages of stator vanes and turbine blades (not labeled). The turbine section 114 also includes a three-stage free or power turbine 128 that drives a propeller gearbox 134, which in turn drives the propeller assembly 106 (FIG. 1). The exhaust section 116 includes one or more exhaust outlets 122 for routing the combustion products to the ambient air.

Referring still to FIG. 2, the core turbine engine 104 can include one or more shafts. For this example, the gas turbine engine 100 includes a compressor shaft 130 and a free or power shaft 132. The compressor shaft 130 drivingly couples the turbine section 114 with the compressor section 110 to drive the rotational components of the compressor. The power shaft 132 drivingly couples the power turbine 128 to drive a gear train 140 of the propeller gearbox 134, which in turn operatively supplies power and torque to the propeller assembly 106 (FIG. 1) via a torque output or propeller shaft 136 at a reduced RPM. The forward end of the propeller shaft 136 includes a flange 137 that provides a mounting interface for the propeller assembly 106 to be attached to the core turbine engine 104.

The propeller gearbox 134 is enclosed within a gearbox housing 138. For this example, the housing 138 encloses the epicyclical gear train 140 that includes a star gear 142 and a plurality of planet gears 144 disposed about the star gear 142. The planetary gears 144 are configured to revolve around the star gear 142. An annular gear 146 is positioned axially forward of the star and planetary gears 142, 144. As the planetary gears 144 rotate about the star gear 142, torque and power are transmitted to the annular gear 146. As shown, the annular gear 146 is operatively coupled to or otherwise integral with the propeller shaft 136. In some examples, the gear train 140 may further include additional planetary gears disposed radially between the plurality of planet gears 144 and the star gear 142 or between the plurality of planet gears 144 and the annular gear 146. In addition, the gear train 140 may further include additional annular gears.

As noted above, the core turbine engine 104 transmits power and torque to the propeller gearbox 134 via the power shaft 132. The power shaft 132 drives the star gear 142, which in turn drives the planetary gears 144 about the star gear 142. The planetary gears 144 in turn drive the annular gear 146, which is operatively coupled with the propeller shaft 136. In this way, the energy extracted from the power turbine 128 supports operation of the propeller shaft 136, and through the power gear train 140, the relatively high RPM of the power shaft 132 is reduced to a more suitable RPM for the propeller assembly 106.

In addition, the gas turbine engine 100 includes one or more controllers 280 that control the core turbine engine 104 and the propeller assembly 106. For this example, the controller 280 is a single unit control device for a Full Authority Digital Engine (FADEC) system operable to provide full digital control of the core turbine engine 104, and in some examples, the propeller assembly 106. The controller 280 depicted in the illustrated example of FIGS. 1 and 2 can control various aspects of the core turbine engine 104 and the propeller assembly 106. For example, the controller 280 can receive one or more signals from sensory or data collection devices and can determine the blade angle of a plurality of propeller blades 150 about their respective pitch axes, as well as their rotational speed about the axial direction A based at least in part on the received signals. The controller 280 can in turn control one or more components of the gas turbine engine 100 based on such signals. For example, based at least in part on one or more speed or blade pitch signals (or both), the controller 280 can be operatively configured to control one or more valves such that an amount of hydraulic fluid can be delivered or returned from a pitch actuation assembly of the gas turbine engine 100 as will be described in greater detail herein. The internal components of the controller 280 will likewise be described in detail herein.

With reference to FIG. 1, during operation of the gas turbine engine 100, a volume of air indicated by arrow 148 passes across the plurality of propeller blades 150 circumferentially spaced apart from one another along the circumferential direction C and disposed about the axial direction A, and more particularly for this example, the axial centerline 102. The propeller assembly 106 includes a spinner 163 aerodynamically contoured to facilitate an airflow through the plurality of propeller blades 150. The spinner 163 is rotatable with the propeller blades 150 about the axial direction A and encloses various components of the propeller assembly 106, such as e.g., the hub, propeller pitch actuator, piston/cylinder actuation mechanisms, etc. A first portion of air indicated by arrow 152 is directed or routed outside of the core turbine engine 104 to provide propulsion. A second portion of air indicated by arrow 154 is directed or routed through the annular inlet 120 of the gas turbine engine 100.

As shown in FIG. 2, the second portion of air 154 enters through the annular inlet 120 and flows downstream to the compressor section 110, which is a forward direction along the axial direction A in this example. The second portion of air 154 is progressively compressed as it flows through the compressor section 110 downstream toward the combustion section 112.

The compressed air indicated by arrow 156 flows into the combustion section 112 where fuel is introduced, mixed with at least a portion of the compressed air 156, and ignited to form combustion gases 158. The combustion gases 158 flow downstream into the turbine section 114, causing rotary members of the turbine section 114 to rotate, which in turn supports operation of respectively coupled rotary members in the compressor section 110 and propeller assembly 106. In particular, the HPT 126 extracts energy from the combustion gases 158, causing the turbine blades to rotate. The rotation of the turbine blades of the HPT 126 causes the compressor shaft 130 to rotate, and as a result, the rotary components of the compressor are rotated about the axial direction A. In a similar fashion, the power turbine 128 extracts energy from the combustion gases 158, causing the blades of the power turbine 128 to rotate about the axial direction A. The rotation of the turbine blades of the power turbine 128 causes the power shaft 132 to rotate, which in turn drives the power gear train 140 of the propeller gearbox 134.

The propeller gearbox 134 in turn transmits the power provided by the power shaft 132 to the propeller shaft 136 at a reduced RPM and desired amount of torque. The propeller shaft 136 in turn drives the propeller assembly 106 such that the propeller blades 150 rotate about the axial direction A, and more particularly for this example, the axial centerline 102 of the gas turbine engine 100. The exhaust gases, denoted by 160, exit the core turbine engine 104 through the exhaust outlets 122 to the ambient air.

It should be appreciated that the example gas turbine engine 100 described herein is provided by way of example only. For example, in other example examples, the engine may include any suitable number or types of compressors (such as e.g., reverse flow and/or axial compressors), turbines, shafts, stages, etc. Additionally, in some examples, the gas turbine engine may include any suitable type of combustor, and may not include the example reverse-flow combustor depicted. It will further be appreciated that the engine can be configured as any suitable type of gas turbine engine, including, for example, turboshaft, turbojets, etc. Moreover, in yet other examples, the engine can be configured as a reciprocating or piston engine. In addition, it will be appreciated that the present subject matter can be applied to or employed with any suitable type of propeller or fan configuration, including, for example, tractor and pusher configurations.

Furthermore, although the gas turbine engine 100 described above is an aeronautical gas turbine engine for propulsion of a fixed-wing aircraft, the gas turbine engine may be configured as any suitable type of gas turbine engine for use in any number of applications, such as marine applications. Furthermore, the innovation could be used on other devices with variable pitch blades such as windmills. The propeller assembly 106 may rotate due to passing of a fluid, such as air or water, across the plurality of blades 150 of the propeller assembly 106.

Figure 3:
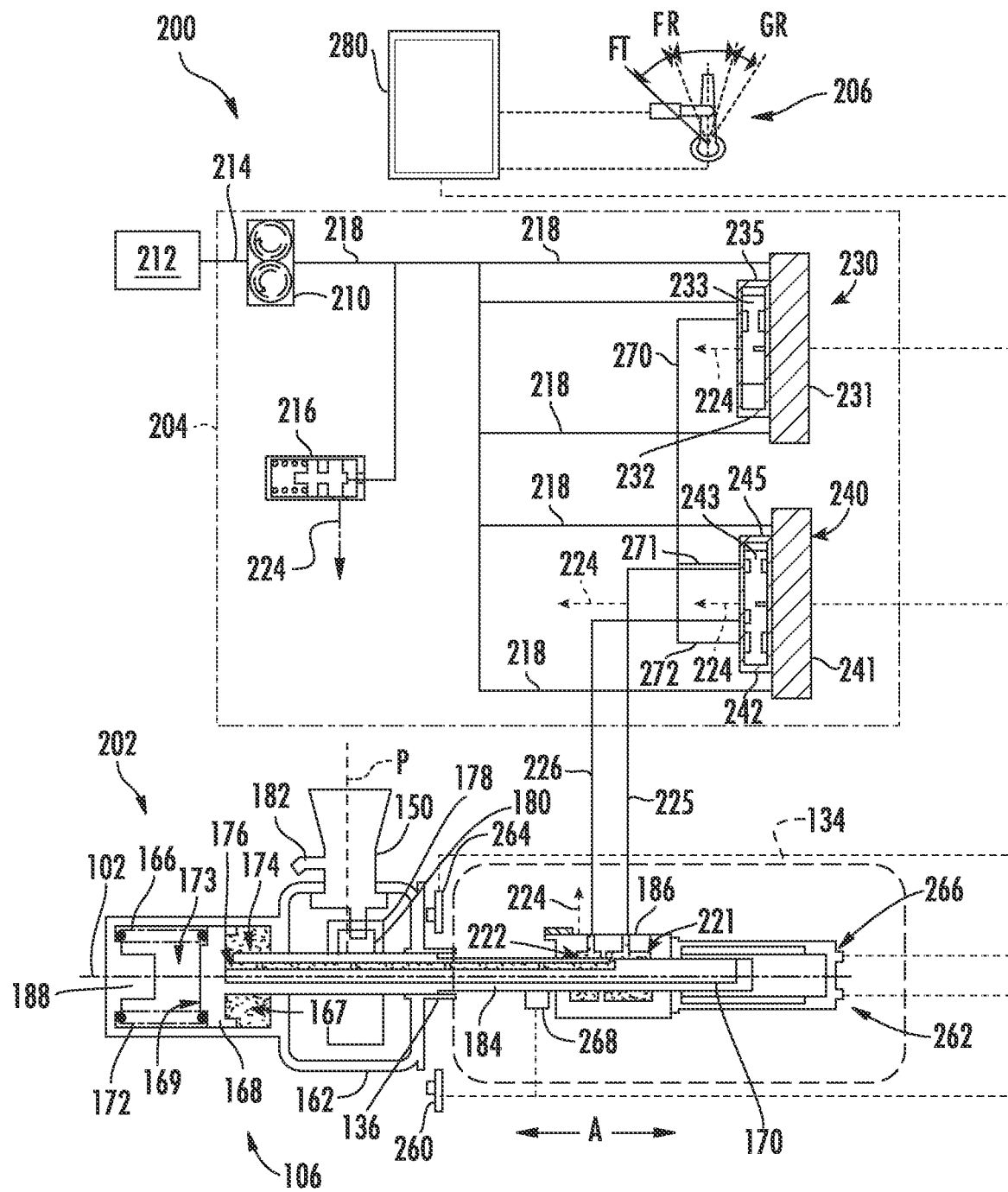
FIG. 3 is a schematic view of an example propeller control system of the gas turbine engine of FIG. 1.

FIG. 3 provides a schematic view of an example propeller control system 200 for controlling the propeller assembly 106 of the gas turbine engine 100 of FIGS. 1 and 2 according to an example of the present disclosure. As depicted in FIG. 3, the propeller assembly 106 is driven by the core turbine engine 104 (FIG. 2) by the propeller shaft 136. The propeller shaft 136 in turn drives a hub 162 from which the plurality of propeller blades 150 extend outwardly from in the radial direction R. As the propeller shaft 136 rotates about the axial direction A, the hub 162 in turn rotates the propeller blades 150 about the axial direction A. The propeller control system 200 includes features for controlling the rotational speed of the propeller blades 150 about the axial direction A and the pitch of the propeller blades 150, as well as features for protecting the components of the propeller assembly 106. As shown in FIG. 3, the propeller control system 200 includes a pitch actuation assembly 202, a pitch control unit 204, a power lever 206, and controller 280.

Generally, the pitch actuation assembly 202 is operatively configured to adjust the plurality of propeller blades 150 through a plurality of blade angles. Stated differently, the pitch actuation assembly 202 is operatively configured to rotate each propeller blade 150 about respective pitch axes P extending in the radial direction R (each pitch axis P is relative to a corresponding propeller blade 150). For the example of FIG. 3, the pitch actuation assembly 202 is operatively configured to rotate the plurality of propeller blades 150 between high or coarse pitch blade angles, including a fully feathered blade angle to low or fine pitch blade angles. Moreover, for this example, the pitch actuation assembly 202 is additionally operatively configured to rotate the plurality of propeller blades 150 through reverse pitch angles, which can be useful for ground or taxiing operations, particularly where an aircraft includes multiple engines. In this regard, the example propeller assembly 106 depicted in FIG. 3 is a variable pitch, full feathering, and reverse enabled propeller assembly, and more particularly still, the propeller assembly is configured as a variable pitch constant-speed, full feathering, reverse enabled propeller assembly. A pilot or aircrew member can operate the propeller assembly 106 in one of the modes noted above utilizing one or more levers. For instance, as shown in FIG. 3, the aircraft to which the gas turbine engine 100 is operatively coupled includes control levers. In particular, for this example, the aircraft includes power lever 206. The power lever 206 can be set within a ground range GR (e.g., for taxiing), within a flight range FR, or within a feathering range FT (e.g., in the event of engine failure). In some examples, the aircraft to which the gas turbine engine 100 is operatively coupled includes other control levers, such as e.g., a condition lever, propeller speed levers, mixture levers, etc.

As further shown in FIG. 3, for this example, the pitch actuation assembly 202 includes a single-acting system for controlling or adjusting the pitch of the propeller blades 150. It will be appreciated, however, that the pitch actuation assembly 202 can be a double-acting system in other examples. The single-acting system pitch actuation assembly 202 of FIG. 3 includes a housing, cylinder or propeller dome 166 that defines a chamber and encloses a control piston 168 that is translatable along the axial direction A within the chamber of the propeller dome 166. In particular, as shown, the propeller dome 166 and the outboard side 169 of the control piston 168 define a first side 173 of the chamber and the propeller dome 166 and the inboard side 167 of the control piston 168 define a second side 174 of the chamber. The control piston 168 separates the first side 173 from the second side 174 of the chamber along the axial direction A. The control piston 168 is biased on its outboard side 169 by a feather spring 172 positioned within the first side 173 of the chamber, as well as by one or more counterweights 182 operatively coupled with one or more propeller blades 150.

The control piston 168 is operatively coupled with a piston rod 184 that extends along the axial direction A. In particular, the piston rod 184 extends from the propeller assembly 106 (where the piston rod 184 is connected to the control piston 168) to the propeller gearbox 134 along the axial direction A. The piston rod 184 and the control piston 168 are translatable in unison. The piston rod 184 encloses an oil transfer or beta tube 170 that also extends along the axial direction A. When the propeller blades 150 are rotated about the axial direction A, the piston rod 184 and the beta tube 170 are likewise rotatable about the axial direction A. Like the piston rod 184, the beta tube 170 extends at least partially into the propeller assembly 106 and at least partially into the propeller gearbox 134 positioned within the gearbox housing 138 (FIG. 2). To control the blade angles of the propeller blades 150, hydraulic fluid (e.g., oil) can be fed through the beta tube 170 and/or other fluid channels to the second side 174 of the chamber (or to the first side 173 of the chamber in a double-acting system) to translate the control piston 168 along the axial direction A. The beta tube 170 can define one or more orifices 176 that permit hydraulic fluid to flow from the hollow beta tube 170 to the second side 174 of the chamber depending on the desired blade pitch. Hydraulic fluid can enter and exit the beta tube 170 through an oil transfer bearing 186 surrounding the piston rod 184 within the propeller gear box 134. The oil transfer bearing 186 defines an annular flight gallery 221 and an annular ground gallery 222.

With reference still to FIG. 3, during operation of the gas turbine engine 100 the spring 172 and the counterweights 182 constantly urge the control piston 168 along the axial direction A (a direction to the right in FIG. 3) such that the propeller blades 150 operatively coupled with the control piston 168 (e.g., by the piston rod and an actuation lever coupled thereto) are driven toward a coarse or high pitch position.

To actuate the propeller blades 150 toward a low or fine pitch position, an amount of hydraulic fluid is delivered to the second side 174 of the chamber such that a force sufficient to overcome the biasing force of the spring 172 and the counterweights 182 is applied to the inboard side 167 of the control piston 168. The hydraulic force on the inboard side 167 of the control piston 168 actuates the control piston 168 along the axial direction A (a direction to the left in FIG. 3). This in turn causes the piston rod 184 and enclosed beta tube 170 to translate forward along the axial direction A (or toward the left in FIG. 3). When the control piston 168 is moved forward along the axial direction A, the propeller blades 150 are rotated to a more fine or low pitch position. When rotated to a more fine position, the propeller blades 150 take less "bite" out of the air when the propeller is operating in a forward mode. In a reverse mode, the propeller blades 150 take a greater "bite" out of the air when rotated to a more fine position.

When it is desired to adjust the angle of the propeller blades 150 back toward coarse or high pitch, an amount of hydraulic fluid within the second side 174 of the chamber is returned or scavenged back to the engine (e.g., via one of the drains 224) such that the spring 172 and the counterweights 182 can urge the control piston 168 rearward along the axial direction A (a direction to the right in FIG. 3). The hydraulic fluid can drain through the beta tube 170 and to the oil transfer bearing 186 positioned within the propeller gearbox 134. The hydraulic fluid can then be drained to a sump or other like structure. When rotated to a more coarse position, the propeller blades 150 take a greater "bite" out of the air when the propeller is operating in a forward mode. In a reverse mode, the propeller blades 150 take less "bite" out of the air when rotated to a more coarse position.

The translation of the control piston 168 along the axial direction A in turn causes the piston rod 184 to translate along the axial direction A as well. To move the propeller blades 150 about their respective pitch axes P, the propeller assembly 106 includes a pitch actuation or propeller pitch actuator 178 to pitch or actuate the propeller blades 150.

When the control piston 168 is translated along the axial direction A, the propeller pitch actuator 178, which is operatively coupled to the piston rod 184, rotates the propeller blades 150 about their respective pitch axes P.

Accordingly, the axial position of the piston rod 184 and beta tube 170 corresponds with a particular blade angle or angular position of the propeller blades 150.

As further shown in FIG. 3, the piston rod 184 encloses beta tube 170 as well as the propeller pitch actuator 178 operatively coupled thereto. The piston rod 184 is operatively coupled with the propeller pitch actuator 178, which in this example includes an actuation lever 180. The actuation lever 180 is operatively coupled to the plurality of blades 150 such that movement of the actuation lever 180 along the axial direction A moves or rotates the plurality of blades 150 about their respective pitch axes P. Stated alternatively, as the piston rod 184 and enclosed beta tube 170 translate along the axial direction A (caused by the axial displacement of the control piston 168), the actuation lever 180 also translates along the axial direction A. This in turn causes the plurality of blades 150 to rotate about their respective pitch axes P, thereby adjusting the blade angles of the propeller blades 150 to the desired pitch. Thus, by controlling the quantity of hydraulic fluid within the second side 174 of the chamber, the propeller blades 150 can be controlled through a plurality of blade angles about their respective pitch axes P by the actuation lever 180.

It will be appreciated that the propeller pitch actuator 178 may include additional or alternative structures that provide pitch actuation functionality. For example, such structures may include actuation linkages linking the control piston 168, piston rod, or other axially displaceable components with the propeller blades 150. Other structures may include a yoke and cam assembly operatively coupled with the beta tube 170 and/or piston rod 184 enclosing the beta tube 170. Any suitable structure can be used to rotate the propeller blades 150 about their respective pitch axes P. Stated alternatively, any known assemblies or structures for converting the translatory motion of the piston rod 184 into rotational motion of the propeller blades 150 is contemplated.

As further depicted in FIG. 3, an example pitch control unit 204 of the propeller control system 200 is provided. Generally, the pitch control unit 204 is operatively configured to provide an amount of hydraulic fluid to the pitch actuation assembly 202 such that the pitch actuation assembly 202 can adjust the plurality of propeller blades 150 through a plurality of blade angles. More specifically, the pitch control unit 204 is operatively configured to deliver or return an amount of hydraulic fluid from the second side 174 of the chamber such that the control piston 168 is translated along the axial direction A, which in turn drives the piston rod 184 along the axial direction A, causing the propeller pitch actuator 178 to adjust the plurality of propeller blades 150 about their respective pitch axes P.

The pitch control unit 204 includes a high pressure pump 210 positioned downstream of and in fluid communication with a lubrication supply 212, such as e.g., hydraulic fluid from the engine. The lubrication supply 212 is configured to supply hydraulic fluid, such as e.g., oil, to the propeller control system 200. The high pressure pump 210 is operatively configured to increase the pressure of the hydraulic fluid as it flows from the lubrication supply 212 downstream to the components of the propeller control system 200. A lubrication supply conduit 214 provides fluid communication between the lubrication supply 212 and the high pressure pump 210.

A pressure relief valve 216 is positioned downstream of the high pressure pump 210 and is in fluid communication with the high pressure pump 210. The pressure relief valve 216 is in fluid communication with the high pressure pump 210 via a high pressure (HP) conduit 218. The pressure relief valve 216 is operatively configured to regulate the pressure of the hydraulic fluid within the propeller control system 200. In the event the pressure of the hydraulic fluid within the HP conduit 218 exceeds a predetermined threshold, the pressure relief valve 216 can drain an amount of hydraulic fluid from the HP conduit 218. In particular, the pressure of the hydraulic fluid acting on the control piston of the pressure relief valve 216 overcomes a spring biasing force applied by a spring of the pressure relief valve 216, allowing an amount of hydraulic fluid to drain from the system, as indicated by 224. The hydraulic fluid can then be scavenged to the lubrication supply 212, for example.

With reference still to FIG. 3, the pitch control unit 204 includes a primary pitch control valve 230. The primary control valve 230 is operatively configured to adjust the propeller pitch or blade angles of the propeller blades 150 during normal operation of the engine. For this example, the primary control valve 230 is a spool-type directional EHSV. The primary control valve 230 is positioned downstream of and is in fluid communication with the high pressure pump 210. In particular, the primary control valve 230 is in fluid communication with the high pressure pump 210 via the HP conduit 218. A first portion of the high pressure hydraulic fluid from the high pressure pump 210 is delivered to a first stage 231 of the primary control valve 230, which is a double nozzle-flapper valve that includes a toque motor, a flapper, two nozzles, and a feedback spring. A second portion of the high pressure hydraulic fluid from the high pressure pump 210 is delivered to a second stage 232 of the primary control valve 230, which is a precision control spool valve. The second stage 232 of the primary pitch control valve 230 has a valve body 235 defining a chamber and a spool 233 movable within the chamber. The first portion of the high pressure hydraulic fluid delivered to first stage 231 can be used to actuate the second stage 232 precision control spool. In this way, the primary control valve 230 can selectively control or allow a flow of hydraulic fluid to or from the pitch actuation assembly 202. For instance, the first stage 231 can control the spool 233 of the second stage 232 to actuate or remain in a null position depending on the condition in which the propeller is operating. At times, if there is excess hydraulic fluid within the primary control valve 230, the fluid can be scavenged to the lubrication supply 212, for example, as denoted by drain 224.

Generally, the propeller assembly 106 operates in one of three conditions while the aircraft is in flight, including an onspeed condition, an overspeed condition, or an underspeed condition. An onspeed condition results when the engine is operating at the RPM set by the pilot. An overspeed condition results when the engine is operating above the RPM set by the pilot. As an example, if the aircraft begins to pitch downward into a descent maneuver, the airspeed increases across the propeller blades. When this occurs, the propeller blades are unable to fully absorb the engine power, and as a result, the engine RPM increases above the desired setting resulting in an overspeed condition. An underspeed condition results when the engine is operating below the RPM set by the pilot. As an example, if the aircraft begins to pitch upward into a climb maneuver, the airspeed decreases across the propeller blades. When this occurs, the RPM of the engine decreases below the desired setting. During normal operation, the primary pitch control valve 230 selectively controls a flow of hydraulic fluid to or from the pitch actuation assembly 202 to maintain the RPM of the engine as near as possible to the desired setting, or stated alternatively, to maintain an onspeed condition.

Moreover, for this example, the primary control valve 230 is operatively configured to feather the propeller blades 150 to a feathered position but only upon the failure of a secondary control valve (described below) and upon the occurrence of a failure condition (e.g., an engine failure condition) or upon a user input. For example, if the torque sensor 268 operatively configured to sense the output torque of the propeller shaft 136 senses that the torque is below a predetermined threshold, for this example, the engine is determined to have experienced an engine failure condition. When it is determined that the engine has experienced an engine failure condition and the secondary control valve has failed, the primary control valve 230 is operatively configured to selectively allow a controlled amount of hydraulic fluid to the pitch actuation assembly 202 such that the propeller blades 150 are actuated to a feathered position. This prevents windmilling and cuts drag to a minimum.

Referring still to FIG. 3, the pitch control unit 204 also includes a secondary pitch control valve 240. The secondary pitch control valve 240 is operatively configured to take over overspeed protection functionality in the event the primary control valve 230 fails, becomes unresponsive, or erroneously drives the pitch of the propeller blades 150 toward a fine pitch position. In addition, the secondary pitch control valve 240 is also operatively configured to feather the propeller blades 150 to a full feather position when an engine failure condition has been determined, which can be determined, for example, by sensing an inadequate torque output of the engine. Moreover, the secondary pitch control valve 240 is operatively configured to provide reverse enabling functionality (e.g., removal of the hydraulic lock for minimum pitch) in a way that, by design, avoids the intervention of the overspeed functionality of the secondary pitch control valve 240. Accordingly, the secondary pitch control valve 240 of the present disclosure includes overspeed protection functionality, feathering functionality, and reverse enabling functionality. That is, overspeed, feathering, and reverse functionality is combined into and provided by the secondary pitch control valve 240.

As shown in FIG. 3, the secondary pitch control valve 240 is a spool-type directional EHSV. The secondary pitch control valve 240 has a first stage 241, which is a double nozzle-flapper valve that includes a toque motor, a flapper, two nozzles, and a feedback spring. The secondary pitch control valve 240 also has a second stage 242, which is a precision control spool valve. The second stage 242 of the secondary pitch control valve 240 has a valve body 245 defining a chamber and a spool 243 movable within the chamber. The secondary pitch control valve 240 is positioned downstream of and is in fluid communication with the high pressure pump 210 as well as the primary control valve 230. In particular, the secondary pitch control valve 240 is in fluid communication with the high pressure pump 210 via HP conduit 218. A portion of the high pressure hydraulic fluid from the high pressure pump 210 is delivered to the first stage 241 of the secondary pitch control valve 240 such that the high pressure hydraulic fluid can be used to actuate the spool 243 of the second stage 242. Moreover, hydraulic fluid can flow from the primary control valve 230 to the secondary control valve 240 via a control conduit 270. The control conduit 270 splits into a first control conduit 271 and a second control conduit 272 that feed different ports of the second stage 242 of the secondary control valve 240.

Depending on how the first stage 241 is controlled to actuate the spool 243, the secondary control valve 240 can selectively allow a flow of hydraulic fluid to and from the pitch actuation assembly 202. The first stage 241 controls the spool 243 of the secondary pitch control valve 240 to allow the primary control valve 230 to be in fluid communication with the pitch actuation assembly 202 or to drain fluid from the pitch actuation assembly 202 through the drain 224 depending on the condition in which the propeller is operating or if the engine has experienced a failure condition.

The secondary control valve 240 is fluidly connected with the oil transfer bearing 186 as shown in FIG. 3. Specifically, a flight conduit 225 fluidly connects the secondary control valve 240 with the flight gallery 221 of the oil transfer bearing 186 and a ground conduit 226 fluidly connects the secondary control valve 240 with the ground gallery 222 of the oil transfer bearing 186. The beta tube 170 fluidly connects the flight gallery 221 with the chamber of the propeller dome 166, and more particularly, the beta tube 170 fluidly connects the flight gallery 221 with the second side 174 of the chamber of the propeller dome 166.

In the event that the primary control valve 230 fails, becomes unresponsive, or otherwise becomes inoperable, the secondary control valve 240 is operatively configured to take over the functionality of the primary control valve 230. That is, the secondary control valve 240 takes over constant speed functionality, e.g., maintaining an onspeed condition, feather functionality, and reverse enabling functionality. Accordingly, the secondary control valve 240 is adjustable between a constant speed mode, e.g., to maintain an onspeed a condition, a feather mode, and a reverse mode and is operable to selectively allow a flow of hydraulic fluid to or from the pitch actuation assembly 202 based at least in part on the mode of the secondary control valve 240. Examples are provided below.

Figure 4:
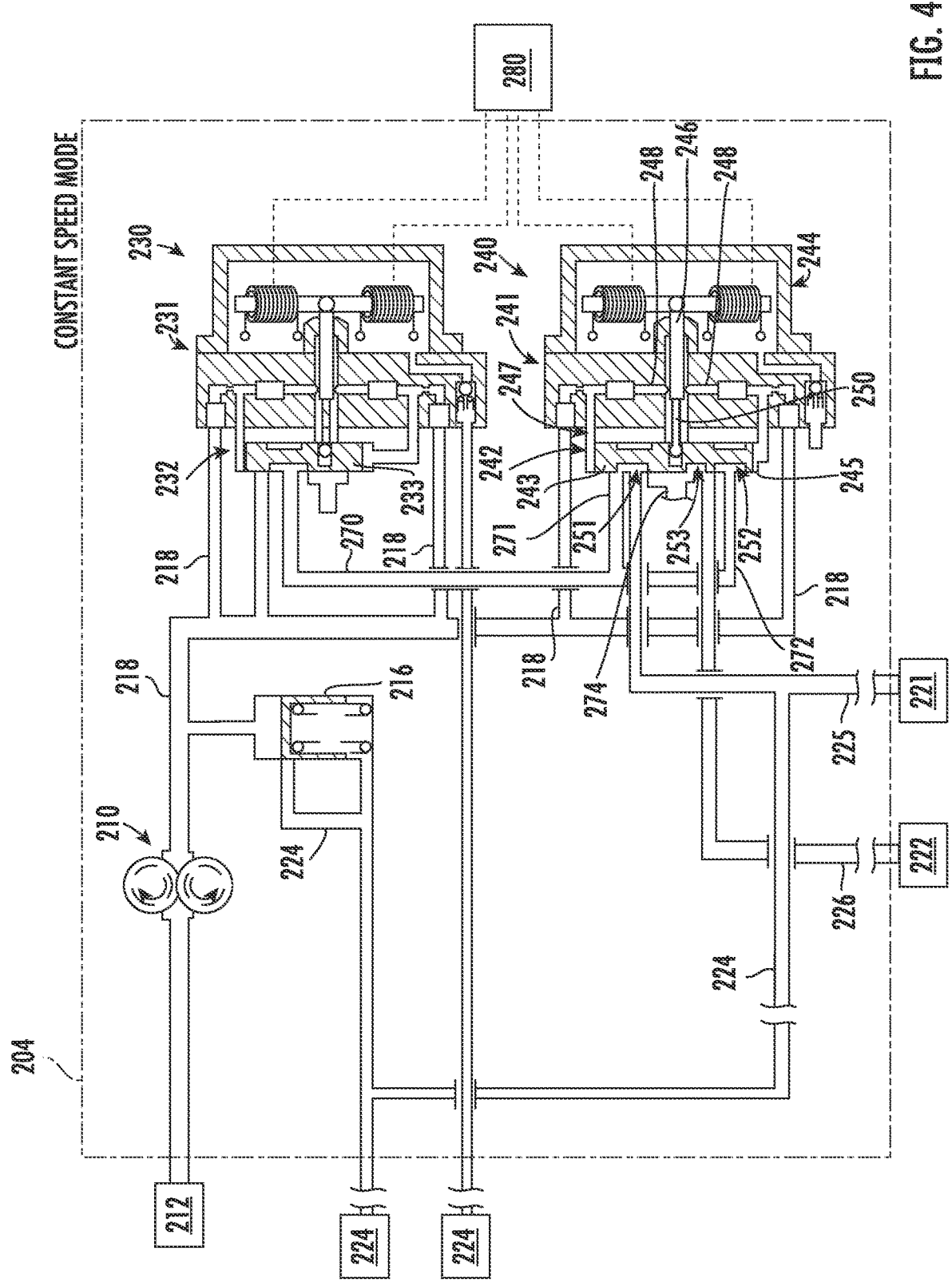
FIG. 4 is a schematic view of a propeller control unit of the propeller control system of FIG. 3 depicting a secondary control valve in a constant speed mode.
Figure 5:
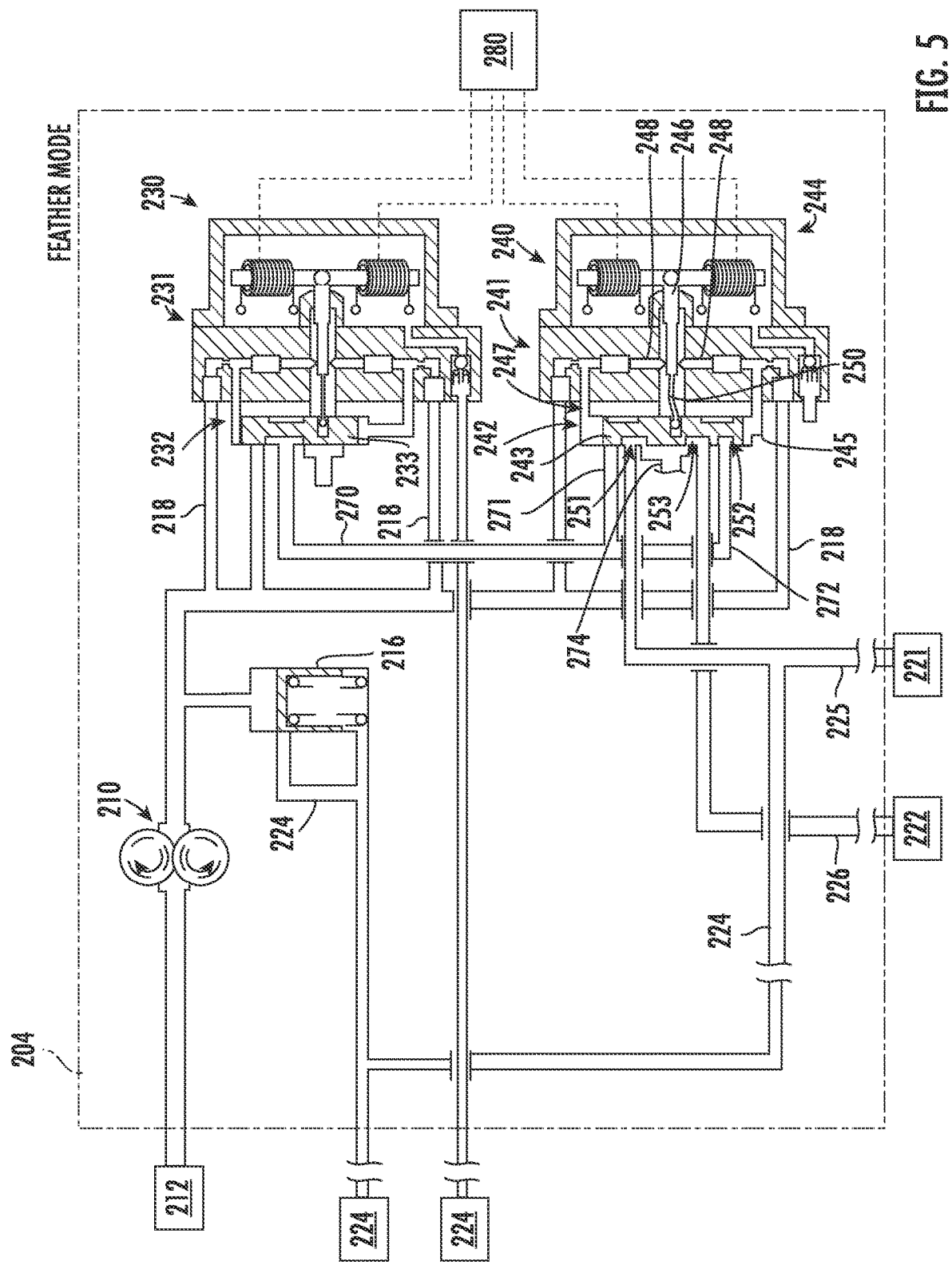
FIG. 5 is a schematic view of the propeller control unit of FIG. 4 depicting the secondary control valve in a feather mode.
Figure 6:
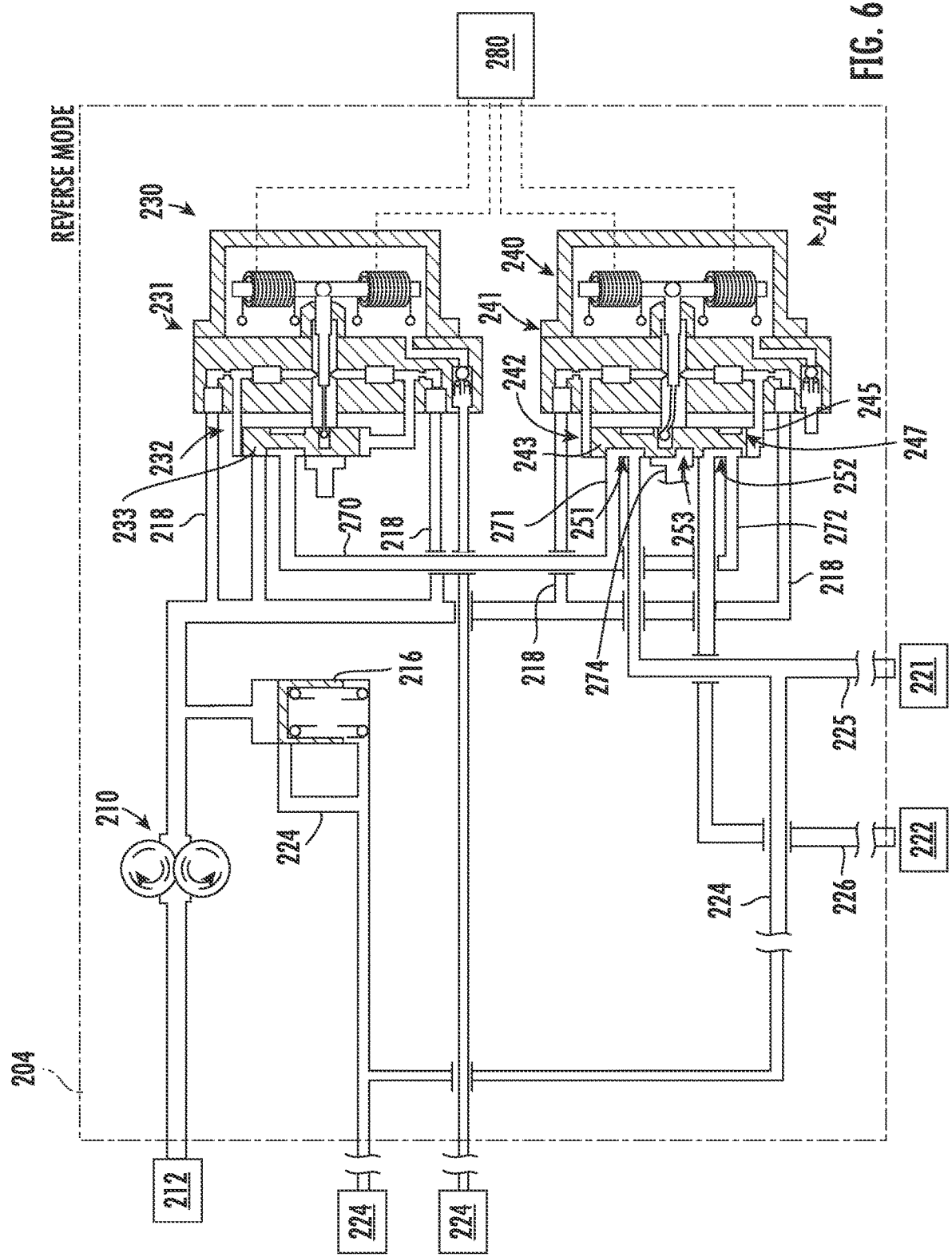
FIG. 6 is a schematic view of the propeller control unit of FIG. 4 depicting the secondary control valve in a reverse mode.

FIGS. 4, 5, and 6 provide schematic views of the propeller control unit 204 of FIG. 3. In particular, FIG. 4 depicts the secondary control valve 240 in a constant speed mode, FIG. 5 depicts the secondary control valve 240 in a feather mode, and FIG. 6 depicts the secondary control valve 240 in a reverse mode. As noted above, the secondary control valve 240 has valve body 245 defining a chamber 247. The spool 243 is movable within the chamber 247. Particularly, the spool 243 is movable between a plurality of constant speed positions in the constant speed mode (FIG. 4), one or more feather positions in the feather mode (FIG. 5), and one or more reverse positions in the reverse mode (FIG. 6) to enable the plurality of propeller blades to rotate to a negative blade angle. Stated differently, the spool 243 is movable between a plurality of constant speed positions (FIG. 4) to operate the variable pitch propeller assembly 106 (FIG. 2) in a constant speed mode, one or more feather positions (FIG. 5) to operate the variable pitch propeller assembly 106 in a feather mode, and one or more reverse positions (FIG. 6) to operate the variable pitch propeller assembly 106 in a reverse mode.

As shown in FIG. 4, the secondary control valve 240 is in a constant speed mode. In the constant speed mode, the secondary control valve 240 controls the flow of hydraulic fluid to the pitch actuation assembly 202 (FIG. 3) to maintain an onspeed condition, e.g., by correcting overspeed and underspeed conditions. When the second control valve 240 is adjusted to the constant speed mode, the secondary control valve 240 selectively allows a flow of hydraulic fluid to flow between the chamber of the propeller dome 166 (e.g., the second side 174 of the chamber) (FIG. 3) and the secondary control valve 240 to maintain an onspeed condition.

More particularly, to maintain an onspeed condition, the controller 280 first determines (e.g., automatically or via pilot input) whether an overspeed or underspeed condition is present. The controller 280 causes one or more electrical signals to be routed to a torque motor 244 of the first stage 241 of the secondary control valve 240. The torque motor 244 can include a first coil and a second coil spaced from the first coil. The first and second coils can be in electrical communication with the controller 280, and in some examples, a dedicated power supply (e.g., a voltage or current source). In some examples, the controller 280 can provide the required electrical power. When the electrical signals are provided to one or both of the coils, an electromagnetic torque is applied to an armature of the torque motor 244 that in turn causes a flapper 246 to deflect or move between a pair of opposing nozzles 248 from its resting or neutral position. Particularly, the flapper 246 moves closer to one nozzle and away from the other, causing a pressure differential over the spool 243. The pressure differential drives the spool 243 to slide or move within the chamber of the valve body 245. The displacement of the spool 243 is fed back to the flapper 246 via a feedback spring 250. The spool 243 continues to slide or move until the flow forces reach equilibrium. The secondary control valve 240 can deliver an output flow proportional to the input electrical power.

The spool 243 defines a first groove 251, a second groove 252, and a third groove 253 spaced between lands of the spool 243. When the spool 243 is in the constant speed mode, the primary control valve 230 is fluidly connected with the first groove 251 via the first control conduit 271 (as well as main control conduit 270); thus, hydraulic fluid can flow from the primary control valve 230 into the first groove 251 of the spool 243 when the spool 243 is in constant speed mode. The first groove 251 is also fluidly connected with the flight conduit 225 in the constant speed mode. Accordingly, hydraulic fluid can flow to the flight gallery 221 (FIG. 3) from the first groove 251 of the secondary control valve 240 (e.g., to move the control piston 168 to the left in FIG. 3 so that propeller blades 150 are moved to a more fine pitch position), or in some instances, hydraulic fluid can flow from the flight gallery 221 (FIG. 3) to the first groove 251 of the secondary control valve 240 (e.g., to move the control piston 168 to the right in FIG. 3 so that propeller blades 150 are moved to a more coarse pitch position). When the spool 243 is in one of the plurality of constant speed positions, the second groove 252 is not fluidly connected with the ground gallery 222 (FIG. 3). In addition, in the constant speed mode, the ground gallery 222 is fluidly connected with a drain 274 thru the third groove 253, which prevents the pitch of the blades from going below the minimum flight pitch during the flight. Drain 274 can be a common scavenge drain. Hydraulic fluid flowing along the drain 274 can be scavenged to the lubrication supply 212, for example.

By changing the electrical power input to the torque motor 244, the spool 243 can be moved or controlled within the chamber 247 to increase to decrease the hydraulic flow to the pitch actuation assembly 202. Stated more particularly, the amount of fluid within the second side 174 of the chamber of the propeller dome 166 can be adjusted so that the control piston 168 can be actuated along the axial direction A, which as noted previously, ultimately adjusts the pitch of the propeller blades 150, e.g., to a more fine or coarse pitch to maintain the onspeed condition. When the propeller blades 150 are moved to a coarsened or higher pitch position to compensate for an overspeed condition, the propeller blades 150 are able to better absorb the engine power, and as a result, the engine RPM decreases to the desired setting. Consequently, the engine can return to an onspeed condition. On the other hand, when the propeller blades 150 are moved to a finer or lower pitch position to compensate for an underspeed condition, the propeller blades 150 absorb less of the engine power, and as a result, the engine RPM increases to the desired setting. Consequently, the engine can return to an onspeed condition.

As shown in FIG. 5, the secondary control valve 240 is in feather mode. As noted, the secondary pitch control valve 240 is operatively configured to feather the propeller blades 150 to a full feather position when an engine failure condition has been determined or via a pilot input. As noted previously, when the secondary control valve 240 is in feather mode, the spool 243 is movable between one or more feather positions. For instance, as depicted in FIG. 5, the spool 243 is moved by the torque motor 244 in a similar manner as described above to a feather position. For this example, the spool 243 is moved in a direction slightly downward relative to the position of the spool 243 in the constant speed mode shown in FIG. 4. The deflection of the feedback spring 250 confirms the slight downward movement of the spool 243 in FIG. 5.

When the secondary control valve 240 is adjusted to the feather mode, the secondary control valve 240 selectively allows the flow of hydraulic fluid to flow from the second side 174 of the chamber of the propeller dome 166 to the secondary control valve 240. More particularly, when the secondary control valve 240 is in the feather mode and thus the spool 243 is moved into one of the one or more feather positions, the primary control valve 230 is not fluidly connected with the first groove 251 of the spool 243. Particularly, the first control conduit 271 is not fluidly connected with the first groove 251. Accordingly, no additional hydraulic fluid can flow from primary control valve 230 to secondary control valve 240 and ultimately to the second side 174 of the chamber of propeller dome 166 (FIG. 3). Further, as shown in FIG. 5, the second groove 252 is not fluidly connected with the ground gallery 222 when the spool 243 is in one of the one or more feather positions. More specifically, a land of the spool 243 that separates the second groove 252 from the third groove 253 prevents hydraulic fluid from flowing along the second control conduit 272 into the second groove 252 and into the ground conduit 226 to eventually flow to the ground gallery 222. Accordingly, additional hydraulic fluid is completely cutoff from flowing to the second side 174 of the chamber of propeller dome 166. Hydraulic fluid can be drained from the second side 174 of the chamber such that the control piston 168 is biased by the spring 172 and the counterweights 182 toward a full feather position (i.e., the control piston 168 can translate along the axial direction A to a position furthest to the right in FIG. 3). In this manner, the propeller blades 150 can be adjusted to a full feather position. In feather mode, the propeller blades 150 can cease rotation about the axial direction A, for example. Further, as shown in FIG. 5, the third groove 253 of the spool 243 provides fluid communication between ground conduit 226 and drain 274 and the first groove 251 of the spool 243 provides fluid communication between flight conduit 225 and drain 274. In this way, hydraulic fluid from the flight gallery 221 and ground gallery 222 can be scavenged, e.g., to lubrication supply 212.

As shown in FIG. 6, the secondary control valve 240 is in reverse mode. As noted, the secondary pitch control valve 240 is operatively configured to reverse the pitch angle of the propeller blades 150, e.g., to create reverse thrust. When the secondary control valve 240 is in reverse mode, the spool 243 is movable between one or more reverse positions. For instance, as depicted in FIG. 6, the spool 243 is moved by the torque motor 244 in a similar manner as described above to a reverse position. That is, for the depicted example of FIG. 6, the spool 243 is moved in a direction slightly upward relative to the position of the spool 243 in the constant speed mode shown in FIG. 4. The deflection of the feedback spring 250 confirms the slight upward movement of the spool 243 in FIG. 6.

When the secondary control valve 240 is adjusted to the reverse mode, the secondary control valve 240 selectively allows the flow of hydraulic fluid to flow from the secondary control valve 240 to the second side 174 of the chamber (FIG. 3) and from the secondary control valve 240 to the ground gallery 222. More particularly, when the secondary control valve 240 is in the reverse mode and thus the spool 243 is in one of the one or more reverse positions, the primary control valve 230 is fluidly connected with the first groove 251 of the spool 243. The first groove 251 is also fluidly connected with the flight gallery 221 via the flight conduit 225 when the spool 243 is in one of the one or more reverse positions as shown in FIG. 6. That is, in one of the reverse positions, the first groove 251 of the spool 243 fluidly connects the first control conduit 271 and the flight conduit 225. Thus, hydraulic fluid can flow from the primary control valve 230 to the secondary control valve 240 and ultimately to the second side 174 of the chamber of the propeller dome 166 (FIG. 3).

Moreover, when the secondary control valve 240 is adjusted to the reverse mode, the second groove 252 of the spool 243 fluidly connects the primary control valve 230 with the secondary control valve 240, e.g., via the second control conduit 272 (as well as main control conduit 270). The second groove 252 is also fluidly connected to the ground gallery 222 via the ground conduit 226 when the spool 243 is in one of the one or more reverse positions as shown in FIG. 6. Thus, hydraulic fluid can flow from the primary control valve 230 to the secondary control valve 240 and ultimately to the ground gallery 222. The flow of hydraulic fluid into the ground gallery 222 can enable the reverse functionality of the propeller assembly 106 (FIG. 3) and the flow of hydraulic fluid into the flight gallery 221 and ultimately to the second side 174 of the chamber can fill into and force the control piston 168 to engage a stop 188 (FIG. 3) (i.e., the control piston 168 is moved to a far left position in FIG. 3 by the hydraulic fluid). Moreover, in reverse mode, fluid can move from the flight gallery 221 and the ground gallery 222 to the primary control valve 230. The primary control valve 230 can drain the fluid (e.g., oil) to the oil system as needed, e.g., to increase the pitch angle of the blades.

As further shown in FIG. 6, when the spool 243 is in one of the one or more reverse positions, the drain 274 is not fluidly connected with the first control conduit 271, the second control conduit 272, the flight conduit 225, or the ground conduit 226. Thus, the third groove 253 of the spool 243 does not fluidly connect the drain 274 with the flight gallery 221, the ground gallery 222, or the primary control valve 230 when the spool 243 is in one of the one or more reverse positions. Accordingly, hydraulic fluid can flow from the primary control valve 230 through first groove 251 of the spool 243 and to the flight gallery 221 via flight conduit 225 without any of the hydraulic fluid draining via drain 274. Moreover, hydraulic fluid can flow from the primary control valve 230 through second groove 252 of the spool 243 and to the ground gallery 222 via ground conduit 226 without any of the hydraulic fluid draining via drain 274. In contrast, as shown in FIGS. 4 and 5, when the spool 243 is in one of the one or more feather positions (FIG. 5) or one of the plurality of constant speed positions (FIG. 4), the third groove 253 of the spool 243 fluidly connects the ground gallery 222 with the drain 274 via the ground conduit 226. Thus, when the spool 243 is in either a feather or constant speed positions, at least some portion of the hydraulic fluid can drain from the ground gallery 222.

Returning to FIG. 3, as noted above, the gas turbine engine 100 includes a controller 280. The controller 280 is communicatively coupled with various components of the propeller control system 200. More specifically, the controller 280 is communicatively coupled with a primary speed sensor 260, a primary blade angle feedback sensor 262, a secondary speed sensor 264, a secondary blade angle feedback sensor 266, the primary pitch control valve 230, the secondary pitch control valve 240, a torque sensor 268, the power lever 206, and other components of the propeller assembly 106. The various components of the propeller control system 200 can be communicatively coupled with the controller 280 in any suitable manner, such as e.g., by wired or wireless communication lines (shown by dashed lines in FIG. 3). The communication between the controller 280 and the various components of the propeller control system 200 will be described in turn.

As shown in FIG. 3, the controller 280 is communicatively coupled with the primary speed sensor 260 and the primary blade angle feedback sensor 262. The primary speed sensor 260 is operatively configured to sense the rotational speed of the piston rod 184, the beta tube 170, or some other rotatory component of the propeller assembly 106 that rotates in unison about the axial direction A with the propeller blades 150. During operation, the primary speed sensor 260 sends or otherwise transmits one or more signals indicative of the rotational speed of the propeller blades 150. The controller 280 receives or otherwise obtains the one or more signals indicative of the rotational speed of the propeller blades 150 and can compare the actual rotational speed of the propeller blades 150 with the RPM set by controller 280. In this manner, the controller 280 can determine whether the propeller assembly 106 is operating in an onspeed condition, an overspeed condition, or an underspeed condition. Based on the determined condition, the controller 280 can send one or more signals to the primary control valve 230 to control the spool 233 of the primary control valve 230 to selectively allow an amount of hydraulic fluid to flow to or from the pitch actuation assembly 202 so that the pitch of the propeller blades 150 can ultimately be adjusted. In this way, the propeller assembly 106 is maintained in or as close as possible to an onspeed condition.

The controller 280 is also communicatively coupled with the secondary speed sensor 264 as well as the secondary blade angle feedback sensor 266. As noted above, in the event the primary control valve 230 fails, becomes unresponsive, or erroneously drives the pitch of the propeller blades 150 toward a fine pitch position, the secondary pitch control valve 240 takes over operation of governing overspeed conditions as well as feathering the propeller blades 150 to a full feather position. The controller 280 then utilizes the secondary speed sensor 264 and may use the secondary blade angle feedback sensor 266 in conjunction with the secondary pitch control valve 240 to control the propeller assembly 106.

The secondary speed sensor 264 is operatively configured to sense the rotational speed of the piston rod 184, the beta tube 170, or some other rotational component of the propeller assembly 106 that rotates in unison about the axial direction A with the propeller blades 150. The secondary speed sensor 264 can continuously sense the rotational speed of the propeller blades 150. The secondary speed sensor 264 sends or otherwise transmits one or more signals indicative of the rotational speed of the propeller blades 150. The controller 280 receives or otherwise obtains the one or more signals indicative of the rotational speed of the propeller blades 150 and can compare the actual rotational speed of the propeller blades 150 with the RPM set in the FADEC system for overspeed governing. In this manner, the controller 280 can determine whether the propeller assembly 106 is operating in an onspeed condition, an overspeed condition, or an underspeed condition. Based on the determined condition, the controller 280 can send one or more signals to the secondary pitch control valve 240 to control the spool 243 to selectively allow an amount of hydraulic fluid to flow to or from the pitch actuation assembly 202 so that the pitch of the propeller blades 150 can ultimately be adjusted. In this way, the propeller assembly 106 can be returned to an overspeed governing onspeed condition.

To improve the accuracy and overall efficiency of the engine 100 and the propeller assembly 106, the controller 280 can receive or otherwise obtain one or more signals from the primary blade angle feedback sensor 262 and/or the secondary blade angle feedback sensor 266. The primary and secondary blade angle feedback sensors 262, 266 are operatively configured to sense the blade angle or pitch of the propeller blades 150 by measuring or sensing the axial position of the piston rod 184, the beta tube 170, or some other rotary component that is translated along the axial direction A in unison with the control piston 168. One or more signals indicative of the axial position of the piston rod 184 are sent or otherwise transmitted from the primary and/or secondary blade angle feedback sensors 262, 266 to the controller 280. The controller 280 receives or otherwise obtains the one or more signals indicative of the axial position of the piston rod 184, and based at least in part on the axial position of the piston rod 184, the controller 280 can determine the blade angle of the propeller blades 150. By knowing the pitch or blade angle of the propeller blades 150, the controller 280 can ensure that the various components of the propeller control system 200 are functioning properly. Moreover, the controller 280 can use the sensed information to improve the timing and flows of the various valves of the system such that the propeller control system 200 can become more efficient and effective at adjusting the pitch of the propeller blades 150.

For certain ground operations as well as inflight reverse thrust requirements, the primary blade angle feedback sensor 262 and/or the secondary blade angle feedback sensor 266 can sense the blade angle or pitch of the propeller blades 150 by measuring or sensing the axial position of the piston rod 184, the beta tube 170, or some other rotary component that is translated along the axial direction A in unison with the control piston 168 in the same or similar manner as noted above. One or more signals indicative of the axial position of the piston rod 184 can be sent or otherwise transmitted from the primary and/or secondary blade angle feedback sensors 262, 266 to the controller 280. The controller 280 receives or otherwise obtains the one or more signals indicative of the axial position of the piston rod 184, and based at least in part on the axial position of the piston rod 184, the controller 280 can determine the negative blade angle of the propeller blades 150.

Figure 7:
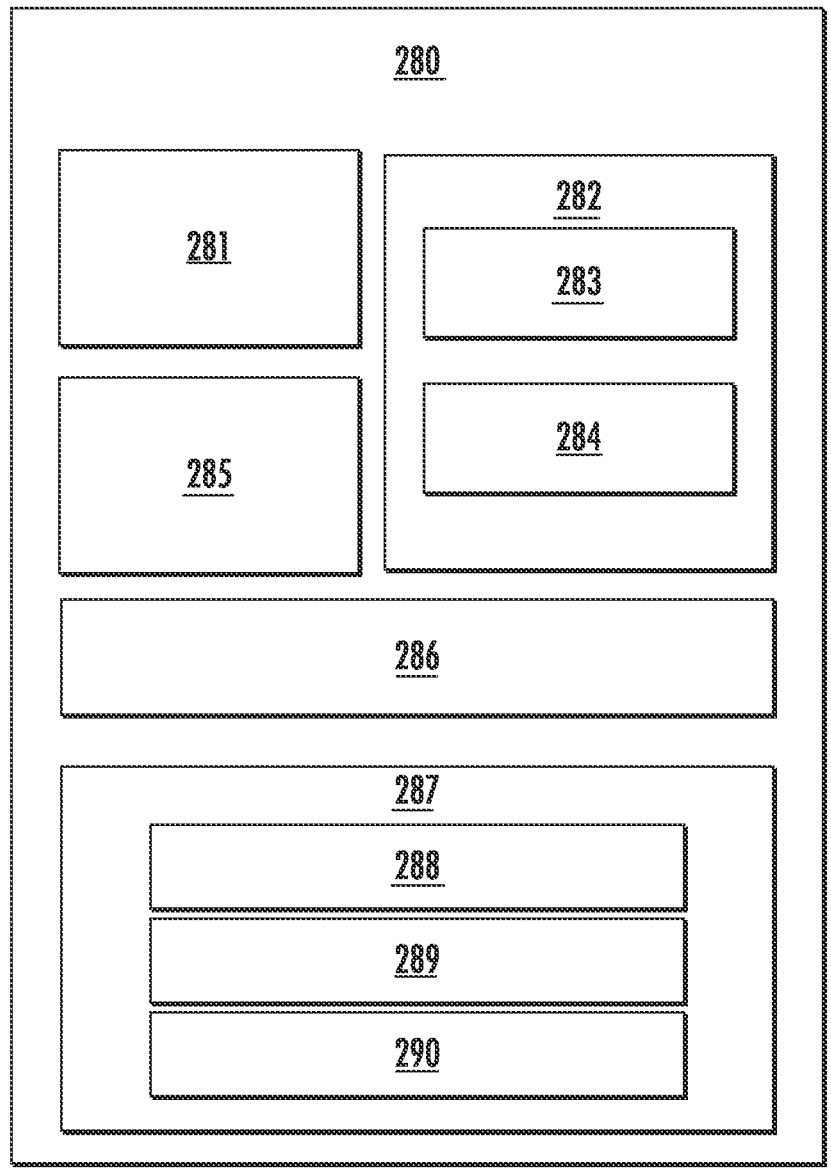
FIG. 7 is an example controller of the gas turbine engine of FIG. 1.

FIG. 7 provides an example controller 280 of the gas turbine engine of FIGS. 1 and 2 for controlling the propeller control system 200 in a manner as described above. The controller 280 includes various components for performing various operations and functions, such as e.g., receiving one or more signals from the sensors of the propeller control system 200 and the power lever 206, determining the condition of the propeller assembly 106 and engine 100, sending one or more signals to the first pitch control valve 230 to control the amount of hydraulic fluid to the pitch actuation assembly 202 if the propeller is determined to be in the overspeed condition or underspeed condition, and the secondary control pitch valve 240 to control the amount of hydraulic fluid to the pitch actuation assembly 202 if the propeller is in an engine failure condition, a feather condition based on a pilot or user input, etc. That is, the controller 280 controls the primary control valve 230 to supply/drain oil to/from the flight gallery 221 and controls the secondary control valve 240 to select the "working" mode in case of a failure of the primary control valve 230.

As shown in FIG. 7, the controller 280 can include one or more processor(s) 281 and one or more memory device(s) 282. The one or more processor(s) 281 can include any suitable processing device, such as a microprocessor, microcontroller, integrated circuit, logic device, and/or other suitable processing device. The one or more memory device(s) 282 can include one or more computer-readable media, including, but not limited to, non-transitory computer-readable media, RAM, ROM, hard drives, flash drives, and/or other memory devices.

The one or more memory device(s) 282 can store information accessible by the one or more processor(s) 281, including computer-readable instructions 284 that can be executed by the one or more processor(s) 281. The instructions 284 can be any set of instructions that when executed by the one or more processor(s) 281, cause the one or more processor(s) 281 to perform operations. In some examples, the instructions 284 can be executed by the one or more processor(s) 281 to cause the one or more processor(s) 281 to perform operations, such as any of the operations and functions for which the controller 280 or controllers are configured, such as e.g., receiving one or more signals from sensors and determining an axial position of the beta tube 170 such that the blade angle of the propeller blades 150 can be determined. The instructions 284 can be software written in any suitable programming language or can be implemented in hardware. Additionally, and/or alternatively, the instructions 284 can be executed in logically and/or virtually separate threads on processor(s) 281.

The memory device(s) 282 can further store data 283 that can be accessed by the one or more processor(s) 281. The data 283 can also include various data sets, parameters, outputs, information, etc. shown and/or described herein. The controller 280 can also include a communication interface 285 used to communicate, for example, with other components of an aircraft in which the gas turbine engine 100 is mounted to, such as e.g., another controller configured to control another engine of the aircraft. The communication interface 285 can include any suitable components for interfacing with one or more network(s), including for example, transmitters, receivers, ports, controllers, antennas, and/or other suitable components.

As shown further in FIG. 7, the controller 280 includes primary logic 286 and secondary logic 287. Although the primary logic 286 and the secondary logic 287 are shown as separate from the one or more processor(s) 281 and the one or more memory device(s) 282, the primary and secondary logic 286, 287 can be embodied in the one or more processor(s) 281 and the one or more memory device(s) 282 described above. The primary logic 286 is operatively configured to control the primary control valve 230. The secondary logic 287 is operatively configured to control the secondary pitch control valve 240. In particular, the secondary logic 287 includes a constant speed logic module 288, a feathering logic module 289, and a reverse logic module 290. The constant speed logic module 288 provides controller 280 with the logic to control the secondary pitch control valve 240 in actuating the propeller blades 150, e.g., to a higher more coarse pitch to ultimately move propeller assembly 106 from an overspeed condition to governing to a selected speed condition. Likewise, the feathering logic module 289 provides controller 280 with the logic to control the secondary pitch control valve 240 in actuating the propeller blades 150 to a full feather position when an engine failure condition has been determined by the controller 280 or upon a user or pilot input. Further, the reverse logic module 290 provides controller 280 with the logic to control the secondary pitch control valve 240 in actuating the propeller blades 150 to a negative pitch position when a reverse condition has been determined by the controller 280 or upon a user or pilot input.

During operation, the powerplant, such as e.g., the engine 100 of FIGS. 1 and 2, defines an axial direction and a radial direction. The engine has a controller, such as e.g., controller 280 described herein. The variable pitch propeller assembly has a plurality of propeller blades rotatable about the axial direction and adjustable about respective pitch axes each extending along the radial direction. The propeller control system has a pitch actuation assembly for actuating the propeller blades about their respective pitch axes and a pitch control unit for driving the pitch actuation assembly. The pitch control unit has a primary control valve and a secondary control valve both communicatively coupled with the controller. The primary control valve and the secondary control valve are each configured to selectively control a flow of hydraulic fluid to or from the pitch actuation assembly. For instance, the primary control valve can control the flow of hydraulic fluid during normal operation. The secondary control valve can control the flow of hydraulic fluid to the pitch actuation assembly when the primary control valve fails or otherwise becomes unresponsive. In this way, the secondary control valve acts as a failsafe.

The controller can receive one or more operational parameters of the powerplant. For instance, in some example implementations, the one or more operational parameters can be indicative of a power setting of the powerplant. The one or more operational parameters indicative of the power setting of the powerplant can be obtained by the controller 280. The power lever 206, or an angular position sensor device, can send one or more signals indicative of the angle of the power lever 206. Based on the angle of the power lever 206, the controller 280 can determine the power setting selected by the pilot. As another example, the power setting selected by the pilot can be digitized, and thus, the power setting can be transmitted to the controller 280 digitally.

In some example implementations, the one or more operational parameters can be indicative of the rotational speed of the propeller blades 150 about the axial direction A. For instance, the rotational speed of the propeller blades 150 can be determined by the controller 280 based on one or more signals from the primary speed sensor 260 and/or the secondary speed sensor 264. The primary or secondary speed sensors 260, 264 can sense or measure the rotational speed of a rotary component, such as, e.g., the piston rod 184, the beta tube 170, or some other rotary component that rotates about the axial direction A in unison with the propeller blades 150.

In some example implementations, the one or more operational parameters can be indicative of a torque output of the powerplant. For instance, the torque sensor 268 positioned proximate the propeller shaft 136 (FIG. 3) can sense the torque output of the core turbine engine 104 of the powerplant. One or more signals indicative of the torque output can be routed to the controller 280.

In some example implementations, the one or more operational parameters can be indicative of an angular position of a condition lever or a selected condition of the powerplant. For instance, the cockpit of the aircraft or vehicle in which the turboprop and propeller assembly are mounted can include a condition lever. A pilot or crew member can selectively adjust the condition lever to select a condition of the propeller assembly. For instance, the angular position of the condition lever can be indicative of a reverse mode or a feather mode.

The controller can determine a condition of the powerplant based at least in part on the one or more operational parameters. For example, the condition could be one of an overspeed condition, an underspeed condition, a feather condition or an engine or powerplant failure condition, a reverse thrust condition, etc.

For example, in implementations in which the one or more operational parameters are indicative of the rotational speed of the propeller blades 150 about the axial direction A, the rotational speed of the propeller blades 150 can be determined and compared to the power setting. In this way, the controller 280 can determine whether the powerplant or engine is operating in an onspeed condition, an underspeed condition, or an overspeed condition. Once the condition of the powerplant or engine is known, the propeller control system 200 can make the necessary adjustments to the pitch of the propeller blades 150, e.g.

As another example, in implementations in which the one or more operational parameters are indicative of a torque output of the powerplant can include comparing the power setting with the torque output of the powerplant. If the torque output of the powerplant is at or below a predetermined threshold for the given power setting, the controller 280 can determine that a powerplant or engine failure condition has occurred. When such a powerplant failure condition has been determined, the controller 280 can send one or more signals to the primary control valve 230 to actuate the primary control valve 230 such that the propeller blades 150 are actuated to a fully feathered position. If, however, the primary control valve 230 fails or is otherwise unresponsive, the controller 280 can send one or more signals to the secondary control valve 240 to actuate the secondary control valve 240 such that the propeller blades 150 are actuated to a fully feathered position.

As a further example, in implementations in which the one or more operational parameters are indicative of an angular position of a condition lever or a selected condition of the powerplant can include determining the condition of the powerplant based at least in part on the angular position of the condition lever or the selected user input.

At, the method includes controlling, by the controller, the secondary control valve adjustable between a constant speed mode, a feather mode, and a reverse mode to selectively allow a controlled amount of hydraulic fluid to or from the pitch actuation assembly based at least in part on the condition determined. For instance, the spool 243 of the secondary control valve 240 of FIGS. 4, 5, and 6 can be moved to selectively allow a controlled amount of hydraulic fluid to or from the pitch actuation assembly based at least in part on the condition determined. For instance, if an overspeed condition or feather condition (e.g., an engine failure condition) is determined, hydraulic fluid can be drained from the pitch actuation assembly in a manner described herein. If, a reverse thrust condition is determined, the hydraulic fluid can be directed to the flight gallery 221 and the ground gallery 222 to enable reverse functionality and to actuate the control piston 168 to a more fine position such that the propeller blades are ultimately pitched to a reverse angle.

It will be understood that the pitch control unit 204 provides high pressure hydraulic actuation oil flow and controls propeller pitch angle in response to commands. FIG. 8 illustrates the primary pitch control valve 230, which as previously described is a torque motor driven double stage valve. During operation torque motor shifts the flapper 246, which then operates to shift the spool 233. FIG. 8 illustrates the primary pitch control valve 230 with a variety of current inputs, with corresponding spool positions and flow to and from the propeller dome 166 (FIG. 3).

When the electrical signals are provided to one or both of the coils, an electromagnetic torque is applied to an armature of the torque motor 244 that in turn causes a flapper 246 to deflect or move between a pair of opposing nozzles 248 from its resting or neutral position, which is shown at the primary pitch control valve 230a. As can be seen in the neutral position with no current supplied, the flow to the drain line 224 from the main control conduit 270 is minimal. The primary pitch control valve 230b shows the assembly with negative 80 miliamps of current provided, as illustrated the flow through the drain line 224 is fully open from the main control conduit 270. The primary pitch control valve 230c shows the assembly with positive 80 miliamps of current provided, as illustrated the flow through the drain line 224 is closed and fluid is supplied from the supply conduit to the main control conduit 270.

As explained above, when it is determined that the engine has experienced an engine failure condition and the secondary control valve has failed, the primary control valve 230 is operatively configured to selectively allow a controlled amount of hydraulic fluid to the pitch actuation assembly 202 such that the propeller blades 150 are actuated to a feathered position. However, if no pressurized oil is available the primary pitch control valve 230 moves to drain for all current inputs. If there is an oil starvation condition, the primary pitch control valve 230, for any electrical current supplied, fluidly couples the flight gallery line 221 to the drain 224. In this way the oil is drained from the dome and an unwanted engine thrust loss occurs.

Again, a neutral input when no oil is supplied will results in a minimal flow to the drain line 224 as illustrated as 230d. The primary pitch control valve 230e shows the assembly with negative 80 miliamps of current provided, as illustrated the flow through the drain line 224 is negligibly open from the main control conduit 270. The primary pitch control valve 230f shows the assembly with positive 80 miliamps of current provided, as illustrated the flow through the drain line 224 is open and fluid is supplied from the main control conduit 270. The controller 280 when the pitch begins to go down, tries to supply oil to the primary pitch control valve 230 and commands a positive current, this in turn drains to the maximum.

The primary pitch control valve 230 needs oil flow to properly lead the propeller pitch. When there is not enough pressure or flow to the first stage of the primary pitch control valve 230, the primary pitch control valve 230 is not able to work correctly. Instead, the primary pitch control valve 230 drains oil from the propeller dome 166 and a coarsening forward feather occurs. The propeller control system 200 including the primary pitch control valve 230 is not able to discriminate between a temporary oil starvation such as when negative g-force occurs for a few seconds from an actual failure or a more severe event; either occurrence will move the propeller assembly 106 in feather position.

Figure 9:
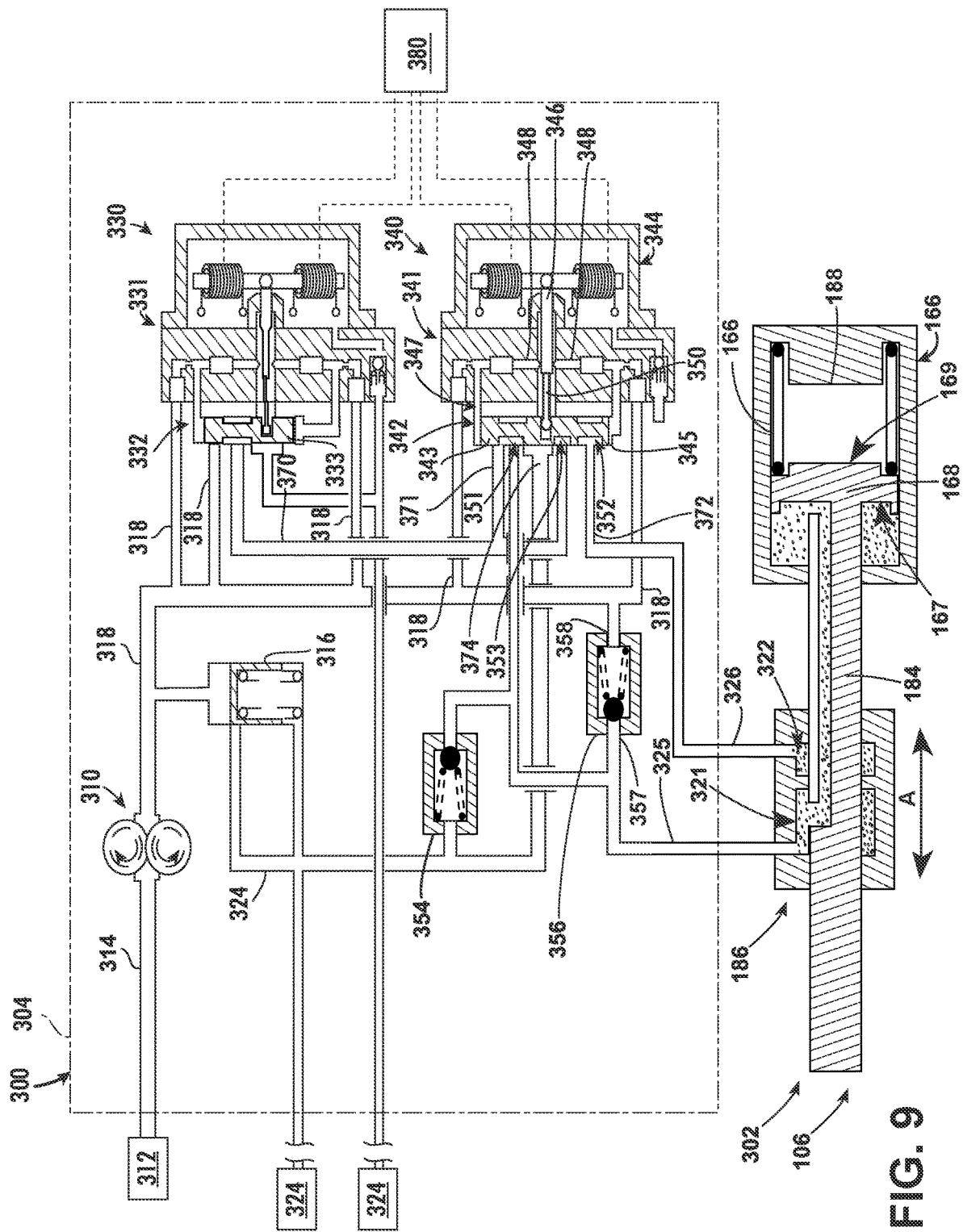
FIG. 9 is a schematic view of an example propeller control system of the gas turbine engine of FIG. 1 having an additional one-way valve.
Figure 10:
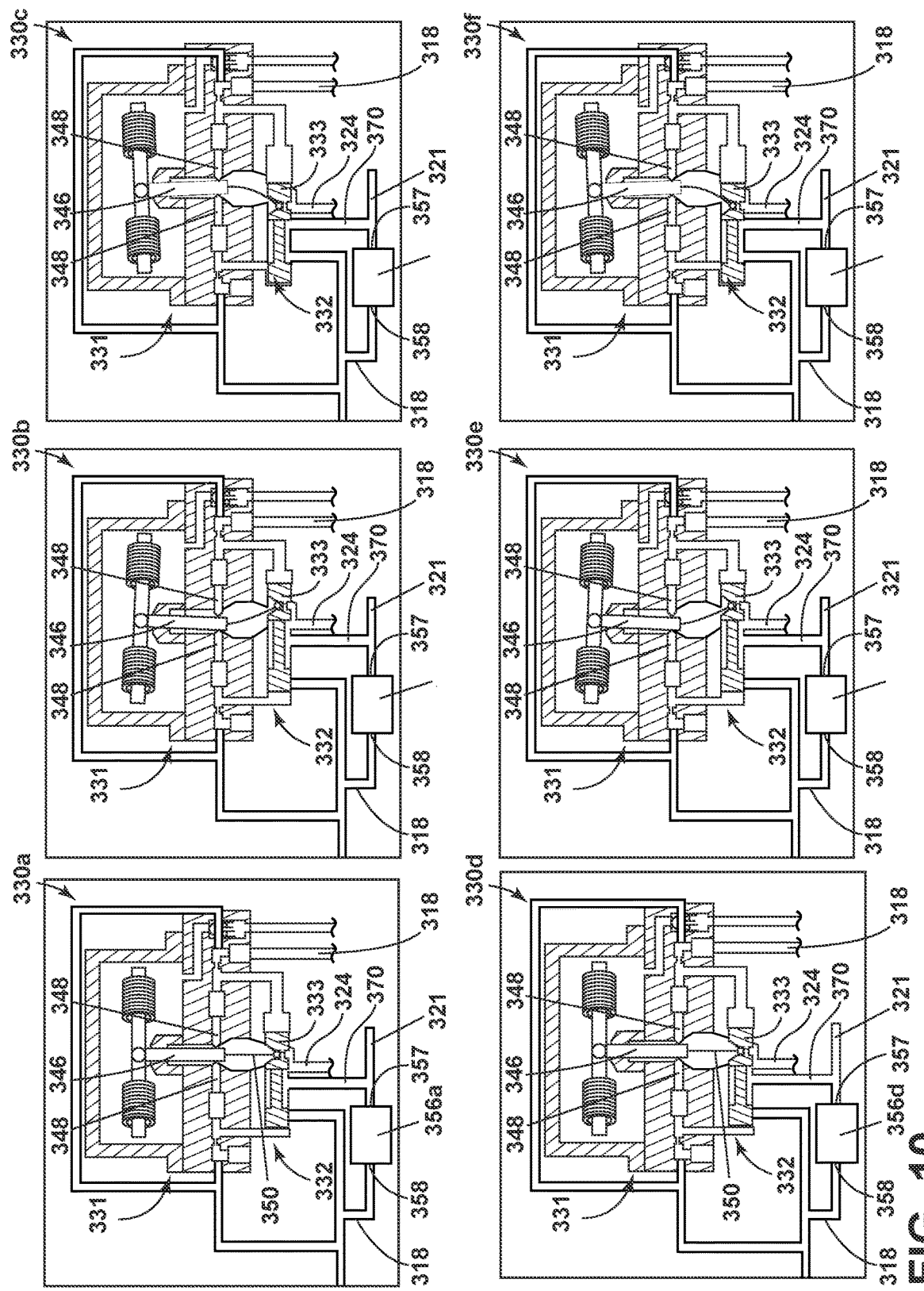
FIG. 10 illustrates pitch control valve behavior in a normal mode and oil starvation mode in the system with the additional one-way valve.

It has been determined that the inclusion of a one-way-relief valve in the pitch control unit will be able to maintain the control conduit of the pitch control valve with a sufficient pressure for a longer time. FIG. 9 illustrates a propeller control system 300 for controlling the propeller assembly 106 of the gas turbine engine 100 of FIGS. 1 and 2 and only a portion of which is shown in FIG. 9. The propeller control system 300 includes similar components as described for the propeller control system 200; therefore, like parts will be identified with like numerals in the 300 series with it being understood that the description of the like parts applies to the accessory tool 400, unless otherwise noted. The propeller assembly 106 is the same even though only a portion is illustrated.

As with the propeller control system 200, the propeller control system 300 includes a pitch actuation assembly 302, a pitch control unit 304, and controller 380. The propeller control system 300 also operates in a similar manner to that of the propeller control system 200.

One difference is the inclusion of an oil starvation valve 356 having an inlet 357 and an outlet 358. The oil starvation valve 356 can selectively fluidly coupled the flow of hydraulic fluid from the propeller dome 166 via the flight conduit 325 to the pitch control unit 304. While the oil starvation valve 356 has been illustrated and described herein as a one-way-relief valve it will be understood that any suitable valve mechanism can be utilized.

Another difference is the inclusion of a dome pressure limiting valve 354 that fluidly connects the flight conduit 325 and flight gallery 321 with the drain 324 such that the hydraulic fluid can be selectively scavenged, e.g., to lubrication supply 312. The dome pressure limiting valve 354 can be any suitable valve including a one-way valve that blocks the blow of fluid to the drain 324. During operation, the dome pressure limiting valve 354 can operate as a relief valve when pressure in the propeller dome 166 exceeds a predetermined threshold.

During operation, depending on how the first stage 341 of the primary pitch control valve 330 is controlled to actuate the spool 343, the secondary control valve 340 can selectively allow a flow of hydraulic fluid to and from the pitch actuation assembly 302. The inclusion of the additional valving does not have an effect on the operation of the propeller control system 300 when oil is available at the inlet ports of the primary pitch control valve 330. The primary pitch control valve 330a is shown at a resting or neutral position when no current is supplied and the oil starvation valve 356a is closed. The flow to the drain line 324 from the main control conduit 370 is minimal. The primary pitch control valve 330b shows the assembly with negative 80 miliamps of current provided and as illustrated the flow through the drain line 224 is fully open from the main control conduit 270 and the oil starvation valve 356b is closed. The primary pitch control valve 330c shows the assembly with positive 80 miliamps of current provided, as illustrated the flow through the drain line 324 is closed and fluid is supplied from the supply conduit to the main control conduit 270, the oil starvation valve 356c is also closed.

However, in the event that no oil is available at the inlet port or nozzles 348 of the primary pitch control valve 330 during operation of the propeller control system 300 the oil starvation valve 356 can be used to supply oil from the propeller dome 166 to first stage 341 of the primary pitch control valve 330 and to avoid going into feather too fast. In such an instance, the pitch control unit 304 internal pressure goes down and oil starvation valve 356 opens as illustrated at 356d, 356e, and 356f. In this manner the flight gallery line 321 and fluid conduit 325 are fluidly coupled via the oil starvation valve 356 to the first stage 341 of the primary pitch control valve 330. Thus, oil is provided and the spool 343 of the first stage 341 of the primary pitch control valve 330 doesn't move to drain oil from the propeller dome 166 if not required. In this manner, even during an oil starvation condition, the primary pitch control valve 330 and the propeller control system 300 can continue to operate as if an oil starvation condition were not occurring although it will be understood that the amount of oil used to supply oil to the first stage 341 of the primary pitch control valve 330 is lower if compared with the oil drained by the primary pitch control valve 330 if the first stage 341 of the primary pitch control valve 330 is without oil.

During operation in an oil starvation condition a range of current can still be provided and depending on how the first stage 341 of the primary pitch control valve 330 is controlled to actuate the spool 343, the secondary control valve 340 can selectively allow a flow of hydraulic fluid to and from the pitch actuation assembly 302. While the oil starvation valve 356d is open, the primary pitch control valve 330d is shown at a resting or neutral position when no current is supplied and the oil and flow to the drain line 324 from the main control conduit 370 is minimal. While the oil starvation valve 356e is open, the primary pitch control valve 330e shows the assembly with negative 80 miliamps of current provided and as illustrated the flow through the drain line 224 is fully open from the main control conduit 270. Finally, when the oil starvation valve 356f is open, the primary pitch control valve 330f shows the assembly with positive 80 miliamps of current provided and the flow through the drain line 324 is closed and fluid is supplied from the supply conduit to the main control conduit 270.

Aspects of the propeller control system 300 provide a variety of benefits including that the one-way relief valve supplies oil to the first stage of the primary pitch control valve in oil starvation events and provides an internal, inexpensive, and lightweight solution to allow the primary pitch control valve to use the propeller dome oil to properly command the primary pitch control valve. Eventually, the propeller blades move to feather but with a lower speed if compared with a solution without the oil's starvation valve. The propeller control system 300 avoids the feather mode in case of short time, such as by way of non-limiting examples 5 seconds or less, oil starvation events such as those caused by negative g-force maneuvers. The oil starvation valve 356 also controls the oil flow from the propeller dome 166 to the pitch control unit 304 as just the oil needed to command the first stage 341 of the primary pitch control valve 330 is needed. While there is a movement of the blade 150 to a greater pitch angle, the full feather mode doesn't occur. The inclusion of the oil starvation valve 356 allows a lower thrust loss if compared with the solution without the oil starvation valve.

Figure 11:
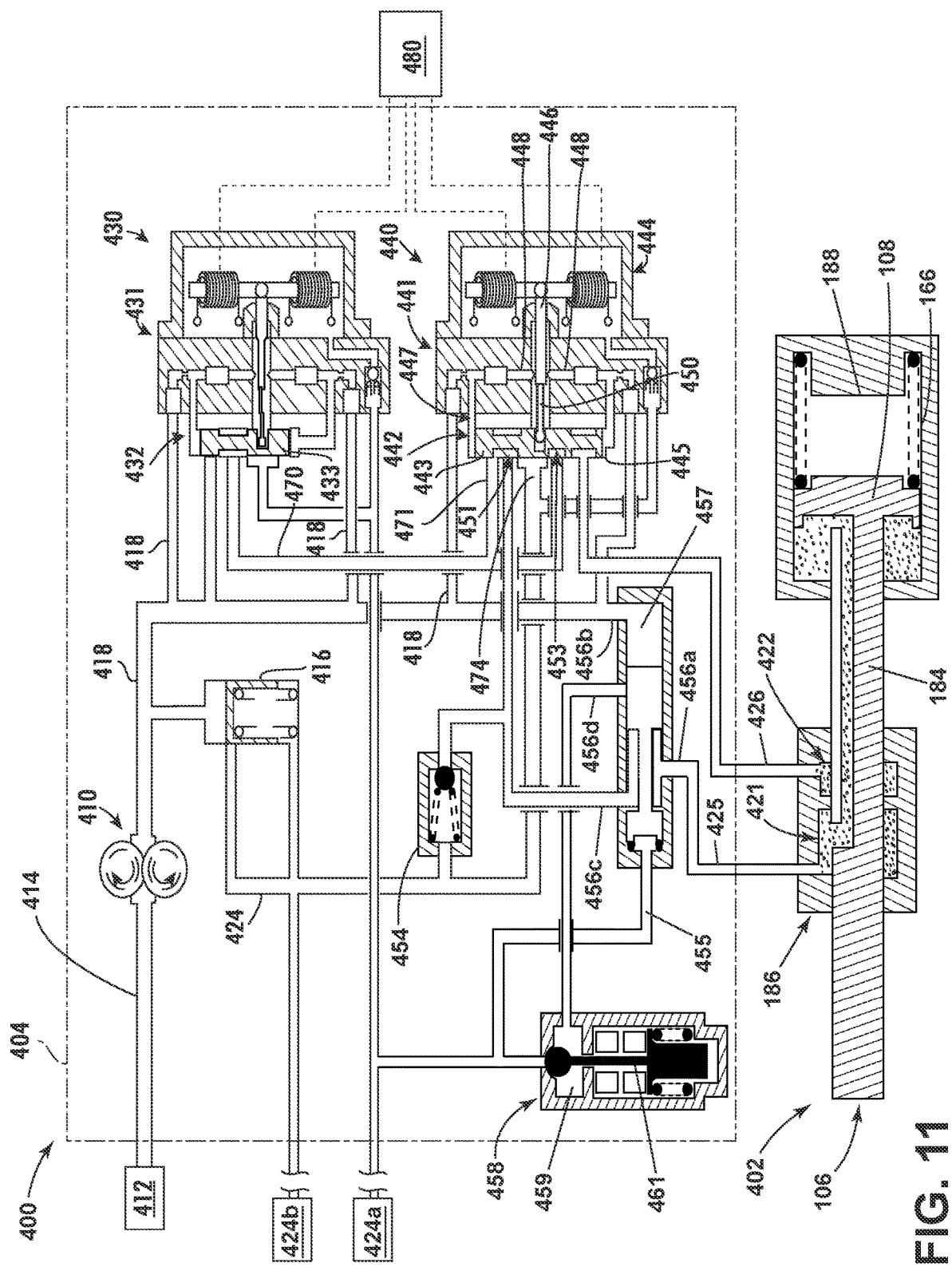
FIG. 11 is a schematic view of an example propeller control system of the gas turbine engine of FIG. 1 with the pitch lock valve in a first position.

It will be understood that additional methods and alternative pitch control units can be utilized to ensure that the control valves operate correctly during oil starvation. By way of additional non-limiting example, FIG. 11 illustrates a propeller control system 400 for controlling the propeller assembly 106 of the gas turbine engine 100 of FIGS. 1 and 2. The propeller control system 400 includes similar components as described for the propeller control system 200; therefore, like parts will be identified with like numerals in the 400 series with it being understood that the description of the like parts applies to the accessory tool 400, unless otherwise noted. The propeller assembly 106 is the same even though only a portion is illustrated.

As with the propeller control system 200, the propeller control system 400 includes a pitch actuation assembly 402, a pitch control unit 404, and controller 480. The propeller control system 400 also operates in a similar manner to that of the propeller control system 200.

Figure 12:
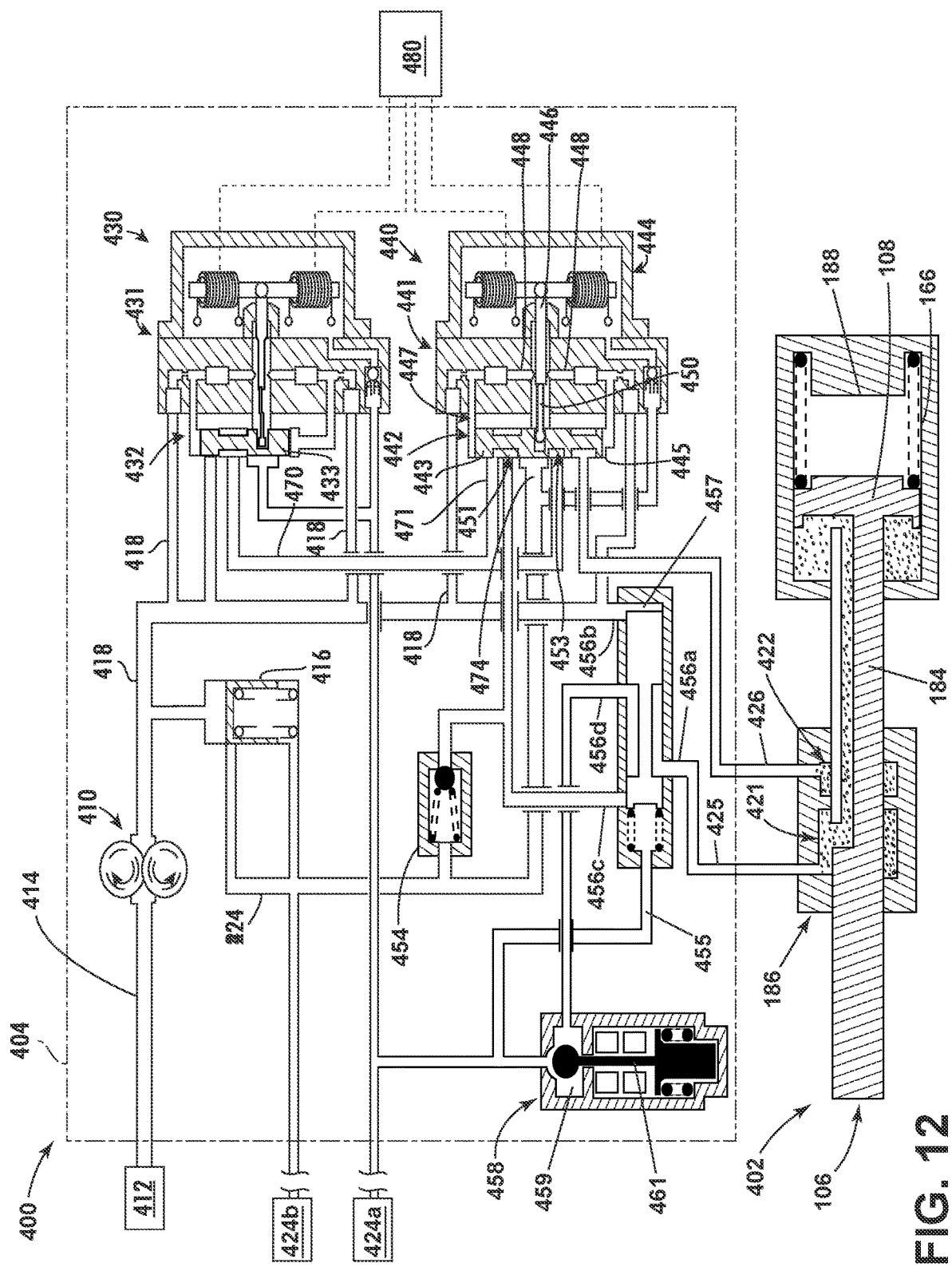
FIG. 12 is a schematic view of the propeller control unit of FIG. 11 with the pitch lock valve in a second position and depicting a solenoid valve in an opened condition that allows for feathering.

One difference is that a pitch lock valve 456 and a solenoid valve 458 have been illustrated as being included in the pitch control unit 404. The pitch lock valve 456 selectively fluidly couples the primary pitch control valve 430 and secondary pitch control valve 440 to the flight gallery 421. More specifically, the pitch lock valve 456 is located on the flight conduit 425 between the components. An inlet 456a to the pitch lock valve 456 is fluidly coupled to the flight gallery 421. A first outlet 456b fluidly couples the primary pitch control valve 430. A second outlet 456c fluidly couples the secondary pitch control valve 440. A third outlet 456d is fluidly coupled with a fluid cavity 459 of the solenoid valve 458. A valve body 457 is moveable to a first position to selectively fluidly couple the inlet 456a to the first outlet 456b and second outlet 456c or to a second position to fluidly couple the inlet 456a or to the third outlet 456d. In this manner the pitch lock valve 456 can simultaneously, in case of oil starvation, stops the oil flow forward the primary pitch control valve 430 and secondary pitch control valve 440 and locks the blade positions of the propeller assembly 106 based on a change in pressure. More specifically when pressure reduces within the pitch control unit 404, the valve body 457 can move from the first position in FIG. 11 to the second position as illustrated in FIG. 12. Hydraulic pressure at the port 455, coupled to the propeller gearbox drain line 424a, can provide the force to move the valve body 457 to the second position.

Adding only a hydraulic pitch lock valve 456 to lock the pitch would not allow the pitch control unit 404 to discriminate if there was a temporary oil starvation or a serious failure. Therefore, to preserve the possibility to feather the propeller assembly 106, in all the conditions, the solenoid valve 458 has been added. The solenoid valve 458 maintains the possibility to drain oil from the propeller dome 166 and allow the feather mode based on user selection. The solenoid valve 458 can be a suitable electro-valve having a moveable spool 461 within a fluid cavity 459 that is solenoid commanded to maintain the ability to feather if needed. The solenoid valve 458 can be communicatively coupled with the controller 480, the FADEC, and/or any suitable control mechanism including an actuator within the aircraft. The moveable spool 461 can be operable between a closed or first position, as illustrated in FIG. 11 and an opened or second position as illustrated in FIG. 12. In the opened position, the moveable spool 461 moves to allow the fluid cavity 459 to be fluidly coupled with the propeller gearbox drain line 424a.

The pitch control unit 404 is also illustrated as including a dome pressure limiting valve 454 although that need not be the case. The dome pressure limiting valve 454 fluidly connects the flight conduit 425 and flight gallery 421 with the drain 424a such that the hydraulic fluid can be selectively scavenged, e.g., to lubrication supply 412. During operation, the dome pressure limiting valve 454 can operate as a relief valve when pressure in the propeller dome 166 exceeds a predetermined threshold.

Typically, if oil starvation occurs, the current primary control valve opens the propeller dome to the drain and the assembly goes into feather mode. However, with the pitch control unit 404, if there is an oil starvation condition, the internal pressure goes down in the pitch control unit 404 and the pitch lock valve 456 locks, interrupts, or otherwise selectively fluidly closes the flight conduit 425. In this manner, if the primary pitch control valve 430 tries to drain oil from the propeller dome 166, the blade pitch is locked to the last value.

Further, during oil starvation, with the pitch control unit 404 if the feather mode is commanded, the solenoid valve 458 moves the spool 461 and oil is drained from propeller dome 166 to the propeller gearbox drain line 424a allowing for the feathering.

Further still, while not illustrated it is contemplated that the pressure relief valve 416 and the pitch lock valve 456 can be integrated into a single valve body or valve mechanism to save on weight, space, or expense.

Aspects of the present disclosure provide a variety of benefits including limiting or forestalling undesired forward feathering of the propeller blades during an oil starvation event. To avoid the feather mode in case of short time, such as 5 seconds, oil starvation events a pitch control lock valve is included. In this manner, if oil starvation is temporary then undesired forward feathering of the propeller blade is avoided; however, if required the pilot or FADEC can command an emergency feathering via the solenoid valve.

To the extent not already described, the different features and structures of the various examples can be used in combination with each other as desired. That one feature is not illustrated in all of the examples is not meant to be construed that it cannot be, but is done for brevity of description. Thus, the various features of the different aspects can be mixed and matched as desired to form new aspects, whether or not those are expressly described. All combinations or permutations of features described herein are covered by this disclosure.

Further aspects of the invention are provided by the subject matter of the following clauses:

1. A variable pitch propeller assembly for an engine defining an axial direction, a radial direction, and a circumferential direction, the variable pitch propeller assembly comprising:
   a plurality of propeller blades rotatable about the axial direction and spaced apart along the circumferential direction, each propeller blade of the plurality of propeller blades rotatable through a plurality of blade angles about respective pitch axes each extending in the radial direction;
   a pitch actuation assembly for adjusting the plurality of propeller blades through the plurality of blade angles and including a propeller dome defining a chamber; and
   a pitch control unit, comprising:
   at least one electrohydraulic servovalve operable to selectively allow a flow of hydraulic fluid to or from the propeller dome of the pitch actuation assembly and when hydraulic fluid is not located at an inlet port of the at least one electrohydraulic servovalve an oil starvation condition is defined; and at least one valve selectively fluidly coupling the propeller dome to the inlet port of the at least one electrohydraulic servovalve.

2. The variable pitch propeller assembly of any preceding clause wherein the at least one valve is a one-way valve having an inlet fluidly coupled to the propeller dome and an outlet fluidly coupled to the inlet port of the at least one electrohydraulic servovalve and during the oil starvation condition the one-way valve is configured to fluidly couple the propeller dome to the inlet port of the at least one electrohydraulic servovalve.

3. The variable pitch propeller assembly of any preceding clause wherein the at least one electrohydraulic servovalve is a primary pitch control valve having a first stage and a second stage and the one-way valve is selectively fluidly coupled with the first stage.

4. The variable pitch propeller assembly of any preceding clause wherein the plurality of propeller blades move to a feather mode during the oil starvation condition at a lower speed as compared the pitch control unit without the at least one valve.

5. The variable pitch propeller assembly of any preceding clause wherein the at least one valve is a pitch lock valve having an inlet fluidly coupled to the propeller dome and a set of outlets and during the oil starvation condition the pitch lock valve is configured to fluidly uncouple the propeller dome to the inlet port of the at least one electrohydraulic servovalve.

6. The variable pitch propeller assembly of any preceding clause wherein the at least one electrohydraulic servovalve comprises a primary control valve operable to selectively allow the flow of hydraulic fluid to or from the pitch actuation assembly and a secondary control valve adjustable between a constant speed mode, a feather mode, and a reverse mode and operable to selectively allow the flow of hydraulic fluid to or from the pitch actuation assembly based at least in part on the mode of the secondary control valve.

7. The variable pitch propeller assembly of any preceding clause wherein the set of outlets includes a first outlet fluidly coupled to a first stage of the primary control valve, a second outlet fluidly coupled to a first stage of the secondary control valve, and a third outlet fluidly coupled a drain line.

8. The variable pitch propeller assembly of any preceding clause wherein the pitch lock valve includes a valve body moveable between a first position wherein the first outlet and the second outlet are fluidly coupled with the inlet and a second position wherein the third outlet is fluidly coupled to the inlet.

9. The variable pitch propeller assembly of any preceding clause wherein the valve body is configured to be moveable from the first position to the second position based on a decrease in internal pressure caused during the oil starvation condition.

10. The variable pitch propeller assembly of any preceding clause, further comprising a solenoid valve fluidly coupled between the third outlet and the drain line and operable to selectively open and close a flow of hydraulic fluid through the drain line.

11. The variable pitch propeller assembly of any preceding clause wherein the solenoid valve is one of user actuated or automatically controller actuated.

12. The variable pitch propeller assembly of any preceding clause wherein actuation of the solenoid valve opens the flow of hydraulic fluid through the drain line.

13. The variable pitch propeller assembly of any preceding clause wherein the secondary control valve includes a valve body defining a chamber and a spool movable within the chamber and where the spool defines a first groove and a second groove, and wherein the primary control valve is fluidly connected with the first groove when the spool is in at least one constant speed position or in at least one reverse position.

14. The variable pitch propeller assembly of any preceding clause wherein the pitch actuation assembly further comprises:
   a control piston translatable within the propeller dome;
   a piston rod connected to the control piston and extending into a propeller gear box of the engine, the piston rod translatable in unison with the control piston;
   an oil transfer bearing surrounding the piston rod within the propeller gear box of the engine and defining a flight gallery fluidly connected with the secondary control valve and a ground gallery fluidly connected with the secondary control valve; and
   a beta tube enclosed within the piston rod and fluidly connecting the flight gallery with the chamber of the propeller dome.

15. The variable pitch propeller assembly of any preceding clause wherein a flight gallery conduit fluidly connects the secondary control valve with the flight gallery and a ground gallery conduit fluidly connects the secondary control valve with the ground gallery.

16. A method for controlling a variable pitch propeller assembly driven by a powerplant, the powerplant defining an axial direction and a radial direction and comprising a controller, the variable pitch propeller assembly having a plurality of propeller blades rotatable about the axial direction and adjustable about respective pitch axes each extending along the radial direction, a propeller control system comprising a pitch actuation assembly for actuating the propeller blades about their respective pitch axes and a pitch control unit for driving the pitch actuation assembly and comprising a primary control valve and a secondary control valve both communicatively coupled with the controller, the primary control valve and the secondary control valve each configured to selectively control a flow of hydraulic fluid to or from the pitch actuation assembly, the method comprising:
   operating the powerplant;
   controlling, by the controller, the secondary control valve adjustable between a constant speed mode, a feather mode, and a reverse mode to selectively allow a controlled amount of hydraulic fluid to or from the pitch actuation assembly; and
   selectively diverting, during an oil starvation condition, hydraulic fluid from a propeller dome of the variable pitch propeller assembly via at least one valve.

17. The method of of any preceding clause wherein the at least one valve is a one-way valve having an inlet fluidly coupled to the propeller dome and an outlet fluidly coupled to an inlet port of the primary control valve and during the oil starvation condition the one-way valve provides fluidly coupling from the propeller dome to the inlet port of the primary control valve.

18. The method of of any preceding clause further comprising controlling a feathering with the primary control valve upon a failure of the secondary control valve.

19. The method of any preceding clause wherein the at least one valve is a pitch lock valve having an inlet fluidly coupled to the propeller dome, a first outlet fluidly coupled to a first stage of the primary control valve, a second outlet fluidly coupled to a first stage of the secondary control valve, and a third outlet fluidly coupled a drain line and where selectively diverting the hydraulic fluid comprises moving a valve body moveable between a first position wherein the first outlet and the second outlet are fluidly coupled with the inlet or a second position wherein the third outlet is fluidly coupled to the inlet.

20. The method of any preceding clause wherein selectively diverting the hydraulic fluid from the propeller dome further includes opening a valve on the drain line to create a feather condition.

This written description uses examples to disclose the innovation, including the best mode, and also to enable any person skilled in the art to practice the innovation, including making and using any devices or systems and performing any incorporated methods. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A propeller controller comprising:
   at least one electrohydraulic servovalve operable to selectively allow a flow of hydraulic fluid to or from a propeller dome; and
   at least one valve selectively fluidly coupling the propeller dome to an inlet port of the at least one electrohydraulic servovalve, wherein the at least one valve includes a one-way valve having an inlet fluidly coupled to the propeller dome and an outlet fluidly coupled to the inlet port of the at least one electrohydraulic servovalve and, the one-way valve having an open position and a closed position, the one-way valve in the open position supply hydraulic fluid from the propeller dome to the inlet port of the at least one electrohydraulic servovalve at a first hydraulic pressure at the inlet port, the one-way valve in the closed position to not supply hydraulic fluid from the propeller dome to the inlet port of the at least one electrohydraulic servovalve at a second hydraulic pressure at the inlet port, the first hydraulic pressure less than the second hydraulic pressure.

2. The propeller controller of claim 1, further including a plurality of propeller blades rotatable about an axial direction and spaced apart along a circumferential direction, each propeller blade of the plurality of propeller blades rotatable through a plurality of blade angles about respective pitch axes each extending in a radial direction.

3. The propeller controller of claim 2, further including a pitch actuation assembly for adjusting the plurality of propeller blades through the plurality of blade angles and including the propeller dome, the propeller dome defining a chamber.

4. The propeller controller of claim 2, wherein the plurality of propeller blades move to a feather mode during an oil starvation condition at a lower speed than without the at least one valve.

5. The propeller controller of claim 1, wherein the at least one electrohydraulic servovalve is a primary pitch control valve having a first stage and a second stage and the one-way valve is selectively fluidly coupled with the first stage.

6. The propeller controller of claim 1, wherein the at least one electrohydraulic servovalve comprises a primary control valve operable to selectively allow the flow of hydraulic fluid to or from a pitch actuation assembly and a secondary control valve adjustable between a constant speed mode, a feather mode, and a reverse mode and operable to selectively allow the flow of hydraulic fluid to or from the pitch actuation assembly based at least in part on the mode of the secondary control valve.

7. The propeller controller of claim 6, wherein the secondary control valve includes a valve body defining a chamber and a spool movable within the chamber and where the spool defines a first groove and a second groove, and wherein the primary control valve is fluidly connected with the first groove when the spool is in at least one constant speed position or in at least one reverse position.

8. The propeller controller of claim 6, further including a pitch actuation assembly including:
- a control piston translatable within the propeller dome;
- a piston rod connected to the control piston and extending into a propeller gear box of an engine, the piston rod translatable in unison with the control piston;
- an oil transfer bearing surrounding the piston rod within the propeller gear box of the engine and defining a flight gallery fluidly connected with the secondary control valve and a ground gallery fluidly connected with the secondary control valve; and
- a beta tube enclosed within the piston rod and fluidly connecting the flight gallery with a chamber of the propeller dome.

9. The propeller controller of claim 8, wherein a flight gallery conduit fluidly connects the secondary control valve with the flight gallery and a ground gallery conduit fluidly connects the secondary control valve with the ground gallery.

10. A method for controlling a variable pitch propeller assembly driven by a powerplant, the method comprising:
- operating the powerplant;
- controlling, using a controller, a first electrohydraulic servovalve adjustable between a constant speed mode, a feather mode, and a reverse mode to selectively allow a controlled amount of hydraulic fluid to or from a pitch actuation assembly of the variable pitch propeller assembly; and
- selectively diverting, during an oil starvation condition, hydraulic fluid from a propeller dome of the variable pitch propeller assembly via a one-way valve, the one-way valve having an inlet fluidly coupled to the propeller dome and an outlet fluidly coupled to an inlet port of a second electrohydraulic servovalve and, wherein, during an oil starvation condition, the one-way valve in an open position to supply hydraulic fluid from the propeller dome to the inlet port of the second electrohydraulic servovalve, when an oil starvation condition is not present, the one-way valve in a closed position to not supply hydraulic fluid from the propeller dome to the inlet port of the second electrohydraulic servovalve.

11. The method of claim 10, further including controlling a feathering with the second electrohydraulic servovalve upon a failure of the first electrohydraulic servovalve.

12. The method of claim 10, wherein selectively diverting the hydraulic fluid from the propeller dome further includes opening a valve on a drain line to create a feather condition.

* * * * *